(12) United States Patent
Xie et al.

(10) Patent No.: US 11,903,554 B2
(45) Date of Patent: Feb. 20, 2024

(54) DOCK ASSEMBLY FOR AUTONOMOUS MODULAR SWEEPER ROBOT

(71) Applicant: ViaBot Inc., Sunnyvale, CA (US)

(72) Inventors: Fei Xie, Palo Alto, CA (US); Dawei Ding, Palo Alto, CA (US); Gregg Ratanaphanyarat, Palo Alto, CA (US)

(73) Assignee: ViaBot Inc., Sunnyvale, CA (US)

( * ) Notice: Subject to any disclaimer, the term of this patent is extended or adjusted under 35 U.S.C. 154(b) by 506 days.

(21) Appl. No.: 17/220,559

(22) Filed: Apr. 1, 2021

(65) Prior Publication Data

US 2022/0104672 A1 Apr. 7, 2022

Related U.S. Application Data

(60) Provisional application No. 63/087,179, filed on Oct. 3, 2020.

(51) Int. Cl.
*A47L 9/28* (2006.01)
*A47L 9/00* (2006.01)
(Continued)

(52) U.S. Cl.
CPC ............ *A47L 9/2873* (2013.01); *A47L 9/009* (2013.01); *A47L 9/2852* (2013.01); *A47L 11/24* (2013.01);
(Continued)

(58) Field of Classification Search
CPC ...... A47L 9/2873; A47L 9/009; A47L 9/2852; A47L 11/24; A47L 11/4011; A47L 11/4038; A47L 11/4061; A47L 11/4066; A47L 11/4072; A47L 2201/022; A47L 2201/04; A47L 9/2805; A47L 9/2831; A47L 11/4005; A47L 11/4041; A47L 11/00; A47L 11/40; A47L 11/4063; A47L 11/4091; A47L 2201/02; B60P 1/02; G05D 1/0088; G05D 1/0214; G05D 1/0219; G05D 1/0223; G05D 1/0225; G05D 1/0238; G05D 1/0251; G05D 1/0274; G05D 1/0278;
(Continued)

(56) References Cited

U.S. PATENT DOCUMENTS

2018/0014709 A1* 1/2018 O'Brien ............... G05D 1/0225
2023/0190062 A1* 6/2023 VanTongeren ........ A47L 9/2873
15/3

* cited by examiner

*Primary Examiner* — Paul Dinh
(74) *Attorney, Agent, or Firm* — Penilla IP, APC

(57) ABSTRACT

A dock assembly is provided. The dock assembly is configured for docking with a robot. An alignment platform of said dock assembly is configured to receive a sweeper module from the robot when the robot is docked and said sweeper module disengages from the robot. The alignment platform has a plurality of cones positioned on a top side of the alignment platform. The plurality of cones are configured to engage a plurality of holes positioned on an underside of the sweeper module when the sweeper module becomes disengaged from the robot. The plurality of cones enable self-alignment of the alignment platform to the sweeper module as the plurality of cones engage the plurality of holes. The alignment platform has a plurality of support pads positioned on a bottom side of the alignment platform. The support pads are configured to rest on a plurality of bearings that permit lateral movement of the alignment platform when the plurality of cones engage the plurality of holes and the alignment platform self-aligns to the sweeper module.

15 Claims, 34 Drawing Sheets

(51) Int. Cl.
*A47L 11/40* (2006.01)
*G05D 1/00* (2006.01)
*A47L 11/24* (2006.01)
*B60P 1/02* (2006.01)

(52) U.S. Cl.
CPC ....... *A47L 11/4011* (2013.01); *A47L 11/4038* (2013.01); *A47L 11/4061* (2013.01); *A47L 11/4066* (2013.01); *A47L 11/4072* (2013.01); *B60P 1/02* (2013.01); *G05D 1/0088* (2013.01); *G05D 1/028* (2013.01); *G05D 1/0214* (2013.01); *G05D 1/0219* (2013.01); *G05D 1/0223* (2013.01); *G05D 1/0225* (2013.01); *G05D 1/0238* (2013.01); *G05D 1/0251* (2013.01); *G05D 1/0274* (2013.01); *G05D 1/0278* (2013.01); *A47L 2201/022* (2013.01); *A47L 2201/04* (2013.01); *G05D 2201/0203* (2013.01); *G05D 2201/0208* (2013.01); *G05D 2201/0215* (2013.01)

(58) Field of Classification Search
CPC ........... G05D 1/028; G05D 2201/0203; G05D 2201/0208; G05D 2201/0215; G05D 1/0044; A01D 34/008; E01H 1/05; E01H 1/08
USPC ........................................................ 320/109
See application file for complete search history.

Bottom View with Close up

Disengaged Pins

Engaging Pins

Engaged Pins

Disengaged Pins

Sweeper Only: Top View

DOCK ASSEMBLY FOR AUTONOMOUS MODULAR SWEEPER ROBOT

CLAIM OF PRIORITY

This application claims priority to U.S. Provisional Application No. 63/087,179, filed on Oct. 3, 2020, entitled "Autonomous Modular Sweeper Robot and Dock System", which is herein incorporated by reference.

RELATED APPLICATIONS

This application is related to U.S. patent application Ser. No. 16/247,482, filed on Jan. 14, 2019, and entitled "Autonomous Modular Robot", which is a Continuation of U.S. patent application Ser. No. 15/152,100, filed May 11, 2016 (U.S. Pat. No. 10,180,685, issued on Jan. 15, 2019), entitled, "Autonomous Modular Robot", wherein U.S. patent application Ser. No. 15/152,100 is a continuation-in-part of U.S. patent application Ser. No. 14/937,633, filed Nov. 10, 2015, entitled "Modular Robot", and claims the priority benefit under 35 U.S.C. § 119(e) of U.S. Provisional Patent Application No. 62/160,059, filed May 12, 2015; and U.S. Provisional Patent Application No. 62/200,814, filed Aug. 4, 2015, the disclosures of which are herein incorporated by reference.

FIELD

The present disclosure relates generally to a multifunctional robot and, more specifically, to a modular robot configured to accept a plurality of interchangeable attachments that may be configured to perform a variety of functions.

BACKGROUND

Autonomous robots are becoming increasingly prevalent due to their ability to automatically perform a variety of tasks that are typically performed manually by humans, or that have been performed with direct human control of a robot. A simple example of an autonomous robot is a robotic floor cleaner such as a robotic vacuum or a robotic mop. These robots are often programmable, allowing users to configure operation times, frequency of operation, and various other settings for the robots. Once programmed, the robots may perform a task, move, and interact with the surrounding environment without requiring further human input. While such robots are becoming more prevalent, the robots are often designed to perform only a single function, such as to clean a surface. As a result, performing a variety of tasks may be difficult and/or prohibitively expensive due to the need to acquire a dedicated autonomous robot for each task that the user wishes to complete.

SUMMARY

In one embodiment, a dock assembly is provided. The dock assembly is configured for docking with a robot. An alignment platform of said dock assembly is configured to receive a sweeper module from the robot when the robot is docked and said sweeper module disengages from the robot. The alignment platform has a plurality of cones positioned on a top side of the alignment platform. The plurality of cones are configured to engage a plurality of holes positioned on an underside of the sweeper module when the sweeper module becomes disengaged from the robot. The plurality of cones enable self-alignment of the alignment platform to the sweeper module as the plurality of cones engage the plurality of holes. The alignment platform has a plurality of support pads positioned on a bottom side of the alignment platform. The support pads are configured to rest on a plurality of bearings that permit lateral movement of the alignment platform when the plurality of cones engage the plurality of holes and the alignment platform self-aligns to the sweeper module.

In some implementations, an autonomous sweeper is provided, including: a sweeper module; a robot chassis having a length along a pair of sides, a front side, a back side and a top side that define an interior space, the sweeper module is configured to fit within the interior space when the robot chassis moves over the sweeper module; a pair of wheels disposed proximate to the back side of the robot chassis and a single wheel disposed proximate to the front side; a pair of scissor lifts disposed along said pair of sides; a lift frame attached to the pair of scissor lifts, the lift frame including alignment pegs that fit into corresponding alignment holes disposed on the top side of the sweeper module, wherein the lift frame is raised and lowered by said pair of scissor lifts; wherein said scissor lifts assist in lifting the sweeper module while aligning said sweeper module to the robot chassis using said alignment pegs and alignment holes.

In some implementations, the lift frame includes a plurality of horizontal beams, said alignment pegs extending vertically downward from the plurality of horizontal beams.

In some implementations, bottom portions of the alignment pegs are substantially conically shaped, enabling self-alignment of the alignment holes to the alignment pegs when the lift frame is lowered onto the top side of the sweeper module.

In some implementations, the lift frame includes a locking mechanism for securing the sweeper module to the lift frame when the alignment pegs are fitted into the alignment holes, to enable the lifting of the sweeper module by the scissor lifts.

In some implementations, the locking mechanism includes a plurality of latch pins, and wherein a plurality of brackets are disposed on the top side of the sweeper module, the latch pins configured to be inserted through the brackets in order to secure the sweeper module to the lift frame.

In some implementations, the autonomous sweeper further includes: a pair of motors that drive the pair of wheels disposed proximate to the back side of the robot chassis; wherein the robot chassis moves over the sweeper module by using said pair of motors to drive the pair of wheels to cause said robot chassis to move in a reverse direction, such that the sweeper module fits between the pair of wheels.

In some implementations, moving the robot chassis over the sweeper module triggers deployment outwards of a pair of brushes of the sweeper module.

In some implementations, the single wheel disposed proximate to the front side of the robot chassis is not driven.

In some implementations, a system is provided, including: a sweeper module; a robot, said robot having a chassis defining an interior space of the robot, the interior space configured to accommodate the sweeper module, said robot configured to engage and disengage the sweeper module, wherein engaging the sweeper module secures the sweeper module to the robot in the interior space, wherein when the sweeper module is secured to the robot, then the robot is capable of moving the sweeper module over a surface; a dock assembly configured for docking of the robot, said dock assembly having an alignment platform that is configured to receive the sweeper module from the robot when the robot is docked and disengages the sweeper module, said alignment platform having a plurality of cones positioned on a top side of the alignment platform, the plurality of cones being configured to engage a plurality of holes positioned on an underside of the sweeper module when the sweeper module becomes disengaged from the robot, wherein the plurality of cones enable self-alignment of the alignment platform to the sweeper module as the plurality of cones engage the plurality of holes, said alignment platform further having a plurality of support pads positioned on a bottom side of the alignment platform, the support pads configured to rest on a plurality of bearings that permit lateral movement of the alignment platform when the plurality of cones engage the plurality of holes and the alignment platform self-aligns to the sweeper module.

In some implementations, the plurality of cones are substantially conically shaped, such that during engagement of a given cone with a corresponding hole, when the given cone is off-center with respect to the corresponding hole, then the given cone self-centers with respect to the corresponding hole.

In some implementations, the self-centering of the given cone with respect to the corresponding hole causes the lateral movement of the alignment platform as permitted by the plurality of support pads that rest on the plurality of bearings.

In some implementations, the plurality of support pads have concave bottom surfaces that contact the bearings, the concave bottom surfaces configured to self-center the support pads over the bearings while permitting the lateral movement of the alignment platform.

In some implementations, the bearings are ball bearings that enable substantially omnidirectional lateral movement of the support pads over the bearings.

In some implementations, the robot includes a lift frame and a lift mechanism, wherein engaging the sweeper module by the robot includes using the lift mechanism to lower the lift frame onto a top side of the sweeper module, securing the sweeper module to the lift frame, and using the lift mechanism to raise the lift frame so as to raise the sweeper module.

In some implementations, the lift frame includes one or more locking pins, and wherein the sweeper module includes one or more brackets positioned on a top side of the sweeper module; wherein securing the sweeper module to the lift frame includes driving the one or more locking pins through the one or more brackets, respectively.

In some implementations, raising the sweeper module causes the cones to disengage from the holes.

In some implementations, an autonomous sweeper system is provided, including: a sweeper module; a robot including a robot chassis, the robot chassis is coupled to wheels for moving the robot autonomously using a motor controlled by a controller, the robot chassis having a pair of sides, a front side, a back side and a top side that define an interior space, the sweeper module is configured to at least partially fit within the interior space when the robot chassis moves over the sweeper module; a lift mechanism connected to said pair of sides of the robot chassis; a lift frame coupled to the lift mechanism, the lift frame including alignment pegs that fit into corresponding alignment holes disposed on a top side of the sweeper module, wherein the lift frame is raised and lowered by said lift mechanism; a locking mechanism is integrated with the lift frame, the locking mechanism is configured to secure the lift frame to the top side of the sweeper module; wherein the controller is configured to control movement of the robot over the sweeper module, control said lift mechanism to lower the lift frame over the sweeper module to connect the alignment pegs with the alignment holes, control the locking mechanism to secure the lift frame to the sweeper module, and control the lift mechanism to raise said lift frame along with the sweeper module toward the interior space of the robot; wherein the robot coupled to said sweeper module, is configured to move autonomously along a path for capturing debris in a container of the sweeper module.

In some implementations, the robot includes a first battery for powering the motor, and said sweeper module includes a second battery for powering the sweeper module, and a battery controller for handling sharing of power between the first battery and the second battery.

In some implementations, the autonomous sweeping system further includes: a dock system for the sweeper module, the dock system includes a movable platform with a plurality of cones that are configured to mate with a corresponding plurality of holes disposed along an underside of the sweeper module; wherein the sweeper module is configured to be placed over the movable platform for charging of the second battery.

In some implementations, the robot is controlled to place the sweeper module over the moveable platform, the plurality of cones engage with the corresponding plurality of holes, and said engaging causes the movable platform to move for enabling the plurality of cones to fit into the corresponding plurality of holes; wherein when the robot is controlled to release the sweeper module when placed over the movable platform, the moveable platform self-centers the sweeper module, wherein the sweeper module being placed and released over the moveable platform allows the robot to move away from the dock system while the sweeper module is serviced and/or the second battery is charged and made ready for said robot or another robot to connect with the sweeper module for conducting a sweeping job.

In some implementations, the robot includes a plurality of cameras and a global positioning system (GPS) for controlling of said movement of the robot by the controller, wherein the robot uses at least one camera to align with a visible code located at the dock system, and images of the visible code are processed by the controller for guiding the robot to align with the dock system when the robot approaches the dock system for pickup or release of said sweeper module.

In some implementations, an autonomous sweeper robot is provided, including: a robot including a robot chassis, the robot chassis is coupled to wheels for moving the robot autonomously using a motor controlled by a controller, the robot chassis having a pair of lateral sides, a front side, a back side and a top side that define an interior space, a sweeper module is configured to at least partially fit within the interior space; a lift mechanism connected to said pair of sides of the robot chassis; a lift frame coupled to the lift mechanism, the lift frame including alignment pegs; a locking mechanism is integrated with the lift frame, the locking mechanism is configured to secure the lift frame to a top side of the sweeper module; wherein the controller is configured to, control movement of the robot over the sweeper module so that at least part of the sweeper module is disposed in the interior space of the robot; control said lift mechanism to lower the lift frame over the sweeper module to connect the alignment pegs with alignment holes of the sweeper module, control the locking mechanism to secure the lift frame to the sweeper module, and control the lift mechanism to raise said lift frame along with the sweeper module toward an upper area of the interior space of the robot.

In some implementations, the robot includes a first battery for powering the motor, and said sweeper module is configured to have a second battery for powering the sweeper module, wherein the robot includes a battery controller for handling sharing of power between the first battery and the second battery.

In some implementations, the autonomous sweeper robot further includes: a dock system for the sweeper module, the dock system includes a movable platform with a plurality of cones that are configured to mate with a corresponding plurality of holes disposed at an underside of the sweeper module.

In some implementations, the autonomous sweeper robot further includes: a power connector coupled to the dock system, the power connector is configured to mate with a corresponding power connector of the sweeper module when the sweeper module is placed over the movable platform; wherein mating the plurality of cones with the corresponding plurality of holes of the sweeper module provides for alignment between the power connector of the dock system and the corresponding power connector of the sweeper module.

In some implementations, the robot coupled to said sweeper module, is configured for autonomous movement along a path that covers an area identified for sweeping, such that debris are swept as the robot traverses the area during a sweeping job.

In some implementations, the robot includes a plurality of cameras and a global positioning system (GPS) for guiding of said movement of the robot by the controller.

In some implementations, the robot uses at least one camera to align with a visible code located at the dock system, and images of the visible code are processed by the controller for guiding the robot to align with the dock system when the robot approaches the dock system for pickup or release of said sweeper module.

The foregoing is a summary of certain embodiments in accordance with implementations of the disclosure. It will be appreciated that other embodiments and implementations will be realized upon a full understanding of the present disclosure.

Figure 1A:
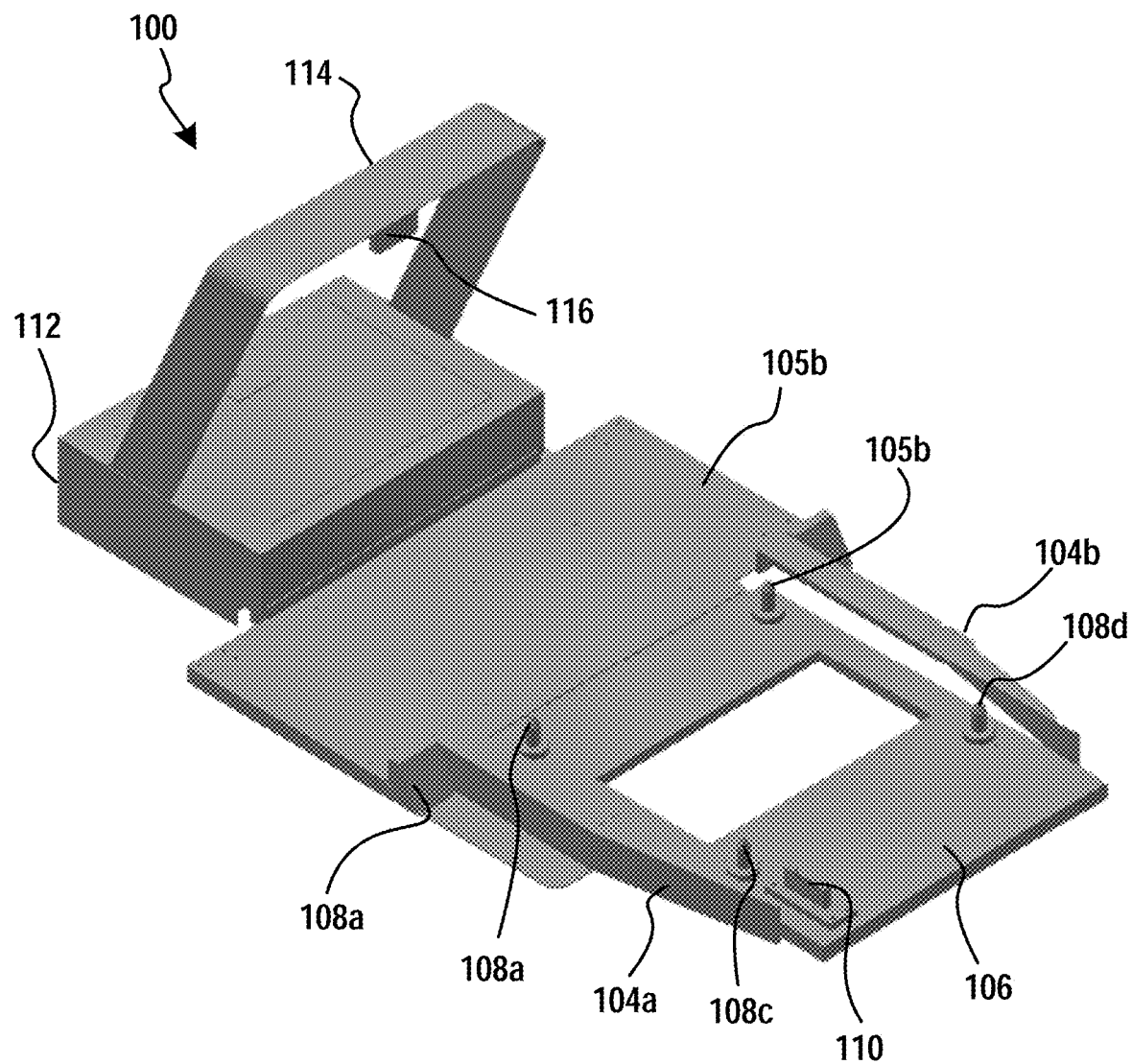
FIG. 1A is a perspective view of a dock assembly 100 for use with a robot and sweeper module, in accordance with implementations of the disclosure.

The drawings are provided to illustrate examples of embodiments and are not intended to limit the scope of the disclosure. In addition, features in the drawings are not necessarily to scale.

DETAILED DESCRIPTION

Broadly speaking, implementations of the present disclosure are drawn to systems for cleaning ground and floor surfaces, such as paved surfaces (e.g. parking lots, roads, etc.), or other types of outdoor or indoor surfaces. More specifically, modular systems for sweeping are provided, and generally include a robot, a sweeper module, and a dock assembly. The robot is mobile, and is configured to engage and retain the sweeper module, and maneuver the sweeper module over a given surface to be cleaned. The sweeper module is a modular unit having brushes that sweep debris from the surface into an included collection container.

Reference will now be made to the drawings, in which like reference numerals refer to like parts throughout.

FIG. 1A is a perspective view of a dock assembly 100 for use with a robot and sweeper module, in accordance with implementations of the disclosure.

Figure 1B:
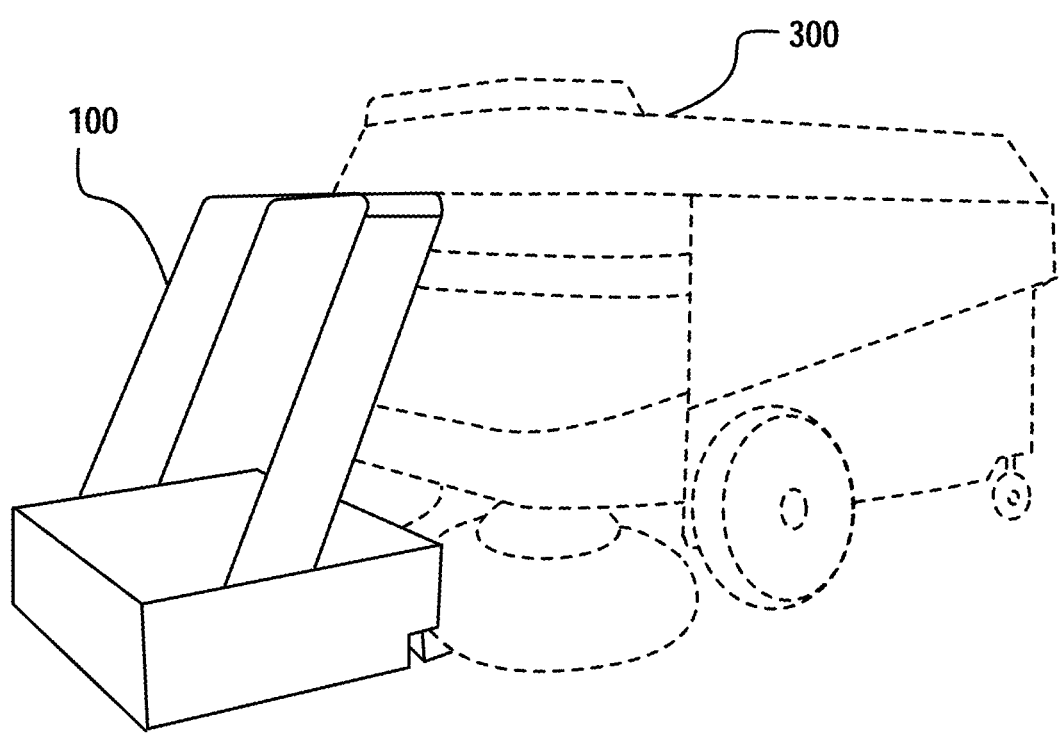
FIG. 1B shows the dock assembly 100 with a robot and sweeper module shown in conceptual form, demonstrating the positioning of the robot and sweeper module when docking at the dock assembly 100, in accordance with implementations of the disclosure.

FIG. 1B shows the dock assembly 100 with a robot and sweeper module shown in conceptual form, demonstrating the positioning of the robot and sweeper module when docking at the dock assembly 100, in accordance with implementations of the disclosure.

The dock assembly 100 is configured as a storage location or home base for the robot and sweeper module, and further is configured to provide charging for batteries that power the robot and the sweeper module. As described in further detail below, the sweeper module can be placed on the dock assembly 100, and detached from the robot for charging. Conversely, the robot can dock at the dock assembly 100 to engage and retrieve the sweeper module from the dock assembly 100 and carry the sweeper module away from the dock assembly 100 for sweeping operations.

As shown in the illustrated implementation, the dock assembly 100 includes a base plate 102. In some implementations, wherein the robot docks in a front-in orientation, with the brushes of the sweeper module oriented towards the dock assembly 100, then the base plate 102 also provides a surface for the brushes to contact or rest upon when the sweeper module is placed on the dock assembly 100.

Guide rails 104a and 104b are positioned on opposite lateral sides of an alignment platform 106. The guide rails 104a and 104b are configured to ensure that the wheels of the robot are properly aligned when docking at the dock assembly 100. In some implementations, the guide rails 104a and 104b are configured to be positioned inside of the wheel track of the wheels of the robot; whereas in other implementations the guide rails are configured to be positioned outside of the wheel track of the wheels of the robot. In either case, if the robot wheels impinge on the guide rails during docking, then the guide rails serve to prevent further misalignment of the robot to the dock assembly 100. Bump stops 105a and 105b prevent the wheels of the robot 300 from traveling too far onto the dock assembly 100.

The alignment platform 106 is configured to receive and support the sweeper module. The alignment platform includes various cones 108a, 18b, 108c, and 108d that point vertically upward and are configured to insert into corresponding holes on the bottom of the sweeper module when the sweeper module is lowered onto the alignment platform 106. The alignment platform 106 further includes a connector 110 for connection to the sweeper module when the sweeper is docked on the alignment platform 106. The connector 110 facilitates charging of, and communication with, the sweeper module. As described in further detail below, the alignment platform 106 is configured to be self-aligning to the sweeper module as the sweeper module is lowered onto the alignment platform; and furthermore, the alignment platform is configured to be self-centering within the dock assembly when the sweeper module is released from the robot.

The dock assembly includes an electronics housing 112 that houses various electronic components for charging and/or data communication. A tag frame 114 is configured to position a tag holder 116 at a predefined elevated location. A tag, such as a QR code or other recognizable tag or image, is attached to the tag holder 116. The tag is recognized by the robot and used to guide the robot when maneuvering towards and docking at the dock assembly 106. For example, in some implementations, the robot recognizes the tag from captured images of the tag, and uses perspective distortion of the tag to determine its position relative to the tag, which is used to guide the robot when docking.

Figure 2:
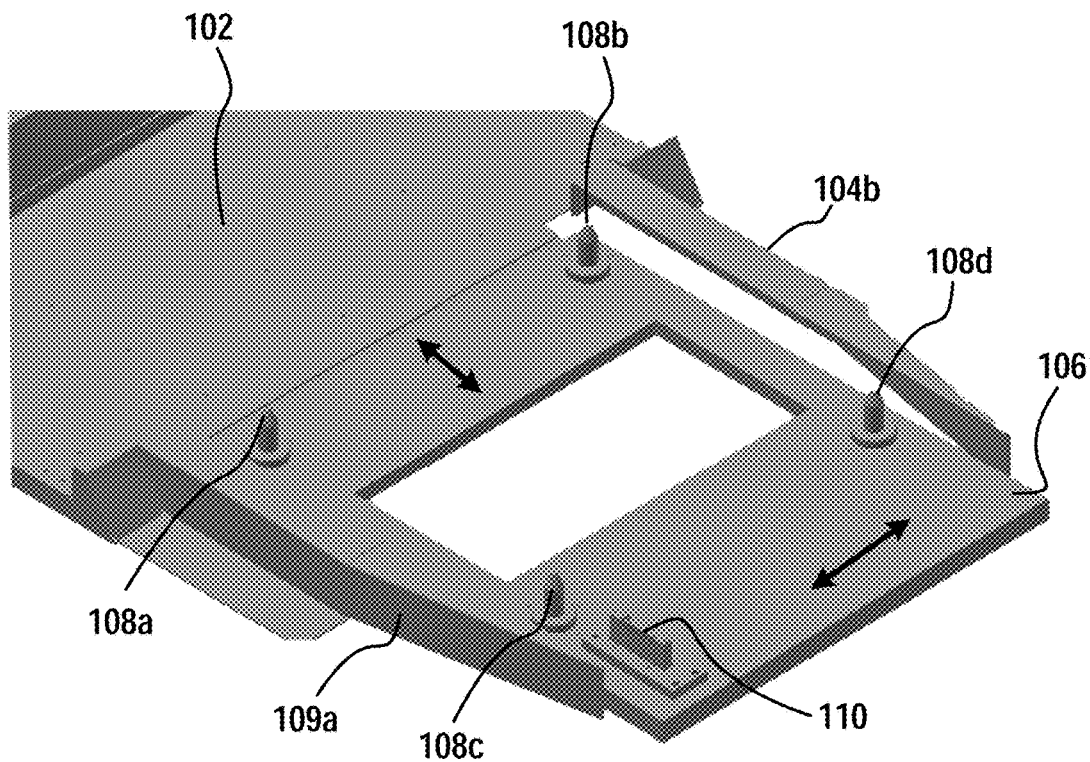
FIG. 2 provides a magnified perspective view of the alignment platform 106, in accordance with implementations of the disclosure.

FIG. 2 provides a magnified perspective view of the alignment platform 106, in accordance with implementations of the disclosure.

As noted, the alignment platform 106 is configured to be movable to a certain extent, including translational movement, rotational movement, etc. so as to self-align to the sweeper module when the sweeper module is being set onto the alignment platform 106. The cones 108*a*, 108*b*, 108*c*, and 108*d* are conically shaped to provide tolerance for misalignment with holes on the underside of the sweeper module.

Figure 3:
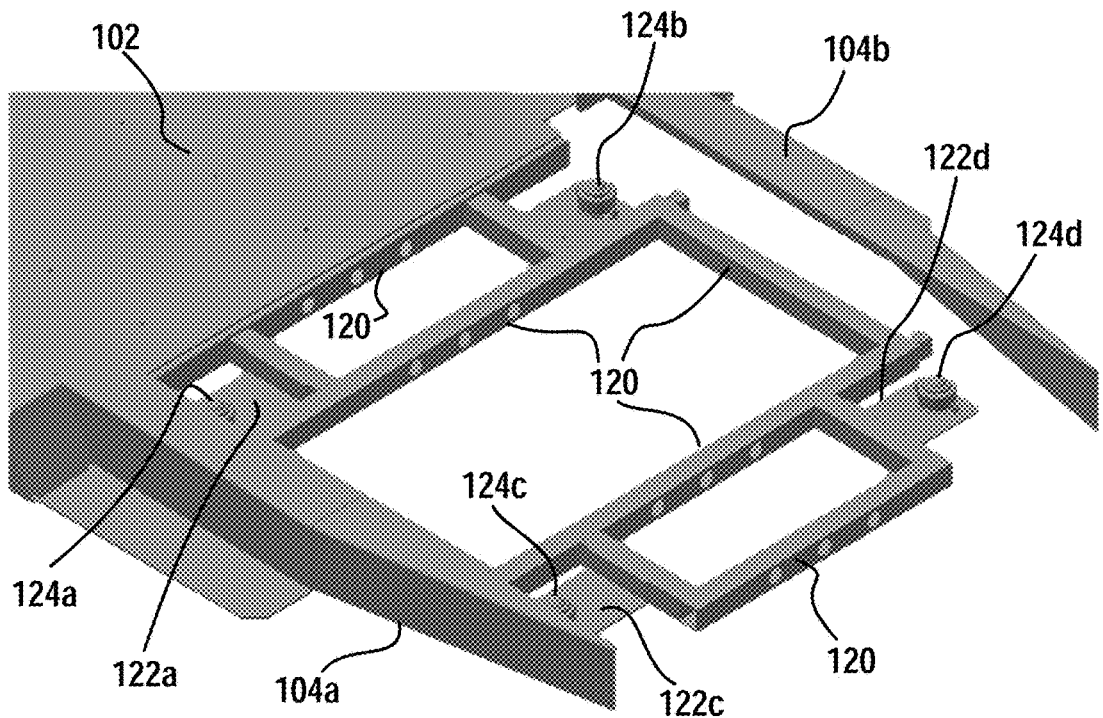
FIG. 3 provides a magnified perspective view of the portion of the dock assembly 100 that lies beneath the alignment platform 106, in accordance with implementations of the disclosure.

FIG. 3 provides a magnified perspective view of the portion of the dock assembly 100 that lies beneath the alignment platform 106, in accordance with implementations of the disclosure.

That is, the portion shown is similar to that of FIG. 2, but with the alignment platform 106 removed to reveal the underlying structures. As shown with continued reference to FIG. 3, a bearing frame 120 is connected to the base plate 102. The bearing frame 120 is formed from a plurality of beams as shown. Further, various mounting plates 122*a*, 122*b*, 122*c*, and 122*d* are attached to the bearing frame 120 as shown. The ball bearings 124*a*, 124*b*, 124*c*, and 124*d* are attached to the mounting plates 122*a*, 122*b*, 122*c*, and 122*d*, respectively. The bearing frame 120 and the associated mounting plates 122*a*, 122*b*, 122*c*, and 122*d* are configured to position the ball bearings so as to align with corresponding pads on the underside of the alignment platform 106, as described further below. As also described in further detail below, the alignment platform 106 rests on the ball bearings 124*a*, 124*b*, 124*c*, and 124*d*, and the ball bearings facilitate movement of the alignment platform 106.

Figure 4A:
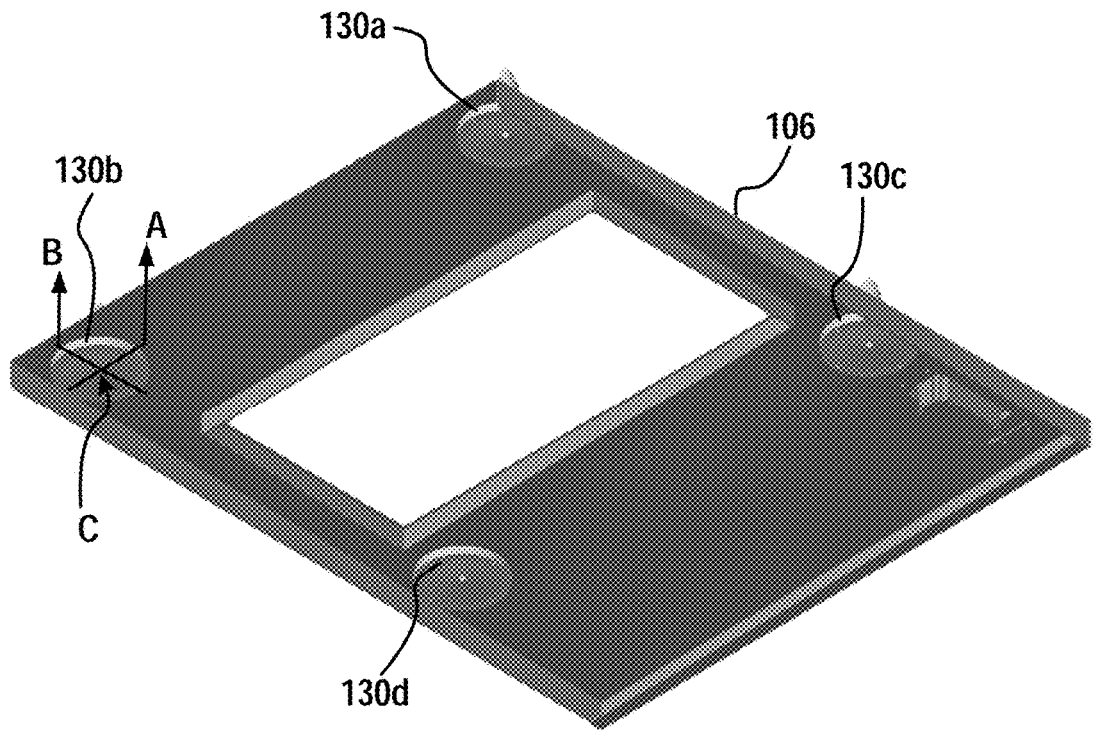
FIG. 4A is a perspective view showing the underside of the alignment platform 106, in accordance with implementations of the disclosure.

FIG. 4A is a perspective view showing the underside of the alignment platform 106, in accordance with implementations of the disclosure.

As shown, various pads 130*a*, 130*b*, 130*c*, and 130*d* are defined on the underside of the alignment platform 106. The pads 130*a*, 130*b*, 130*c*, and 130*d* are positioned so as to rest on top of (and be supported by) ball bearings 124*a*, 124*b*, 124*c*, and 124*d*, respectively. In the illustrated implementation, each pad is defined in the form factor of a disc, having a circular shape. However, in other implementations, the pads can have other shapes, such as ovaloid, square, rectangular, etc. Broadly speaking, the underside of the pad is configured to have a concave form so that when a given pad rests on a corresponding ball bearing, the pad tends to self-center on top of the ball bearing.

Figure 4B:
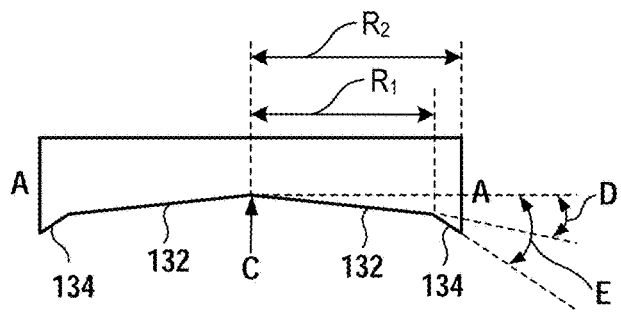
FIG. 4B conceptually illustrates a cross-section A of the pad 130b (pads 130a, 130c, and 130d being similarly configured), in accordance with the implementation of FIG. 4A, in accordance with implementations of the disclosure.

FIG. 4B conceptually illustrates a cross-section A of the pad 130*b* (pads 130*a*, 130*c*, and 130*d* being similarly configured), in accordance with the implementation of FIG. 4A, in accordance with implementations of the disclosure.

As indicated, the contour of the underside surface of the pad 130*b* is concave, such that the middle portion/point C is the highest portion/point of the underside surface. This concave contour causes the pad 130*b* to be self-aligning on the supporting ball bearing 124*b*, which in the absence of forces other than the weight of the pad 130*b* and the supported portion of the alignment platform 106, tends to cause the pad 130*b* to self-align such that the highest point C of the underside surface tends to center over the top point of the supporting ball bearing 124*b*.

In the illustrated implementation, the center point C as shown is the peak of the underside surface contour, which includes an inner underside surface 132, and an outer underside surface 134 that is concentric to and continuous with the inner surface 132. The inner underside surface 132 extends from the center to a first radius R1; whereas the outer underside surface 134 extends from the first radius R1 to a second radius R2. The inner underside surface 132 is substantially conically shaped, with sides that slope downward at an angle D below horizontal as they extend away from the center point C. In some implementations, the downward sloping angle D away from the center point is in the range of about 2 to 10 degrees from horizontal (or −2 to −10 degrees relative to horizontal from center point C outward).

As shown in the illustrated implementation, the outer underside surface 134 of the pad extends downward at a steeper angle E, forming a lip at the edge that acts to prevent the pad from moving off of its ball bearing. In some implementations, the angle E is greater (steeper or further below horizontal, or more negative) than the angle D by an amount of about 2 to 10 degrees.

Figure 4D:
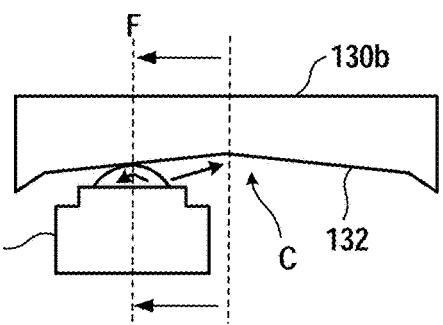
FIG. 4D demonstrates the self-aligning aspect of the pad and corresponding ball bearing, in accordance with the implementation of FIG. 4A.
Figure 4C:
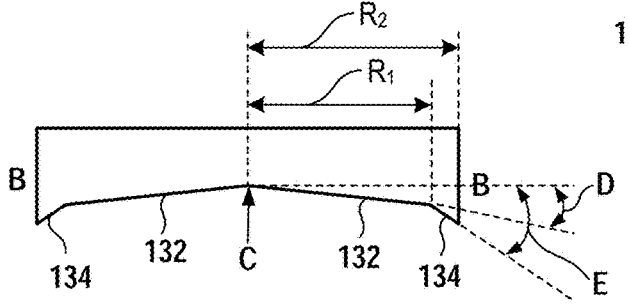
FIG. 4C conceptually illustrates a cross-section B of the pad 130b, in accordance with the implementation of FIG. 4A, in accordance with implementations of the disclosure.

FIG. 4C conceptually illustrates a cross-section B of the pad 130*b*, in accordance with the implementation of FIG. 4A, in accordance with implementations of the disclosure.

The cross-section B is substantially the same as cross-section A, in accordance with the circular shape of the pad 130*b*, demonstrating the conically shaped underside surface of the pad 130*b*. It will be appreciated that in other implementations, the cross-section B may have different dimensions than the cross-section A.

FIG. 4D demonstrates the self-aligning aspect of the pad and corresponding ball bearing, in accordance with the implementation of FIG. 4A.

As shown by way of example without limitation, when the ball bearing 124*b* is off-center with respect to the center of the pad 130*a*, then the contour of the underside surface of the pad 130*b*, being concave and/or sloped downward away from the center of the pad, tends to cause the pad 130*b* to move towards being centered over the ball bearing 124*b*, such that the highest point of the underside surface is centered over the top of the ball bearing 124*a*. In the illustrated implementation, the center axis of the pad 130*b* moves into alignment with the center axis F of the ball bearing 124*b*. This self-aligning aspect of the ball bearing and pad combination applies to each of the pads and their respective ball bearings, so that the alignment platform 106 is capable of substantially lateral movements in all directions, as well as substantially horizontal rotational or twisting movements, while automatically returning to a default centered alignment (in which each of the pads is centered over its corresponding ball bearing) when forces causing such movements are no longer present.

Though in some implementations, the concave shape is substantially conically shaped, it will be appreciated that in other implementations, the concave shape can have other types of shapes that also self-center or self-align over the ball bearing as described.

In the illustrated implementation described thus far, four pads and four corresponding ball bearings have been shown. However, in other implementations, there can be three or more pads and three or more corresponding ball bearings.

Furthermore, it is noted that in the illustrated implementation shown and described thus far, the pads are aligned along the same axes as the various cones. That is, each pad is disposed beneath one of the cones. This also means that in the default positioning of the alignment platform 106, each ball bearing is also aligned with a corresponding pad and cone. However, in other implementations, the pads (and ball bearings) are not necessarily aligned with, or disposed below, the cones.

Figure 5:
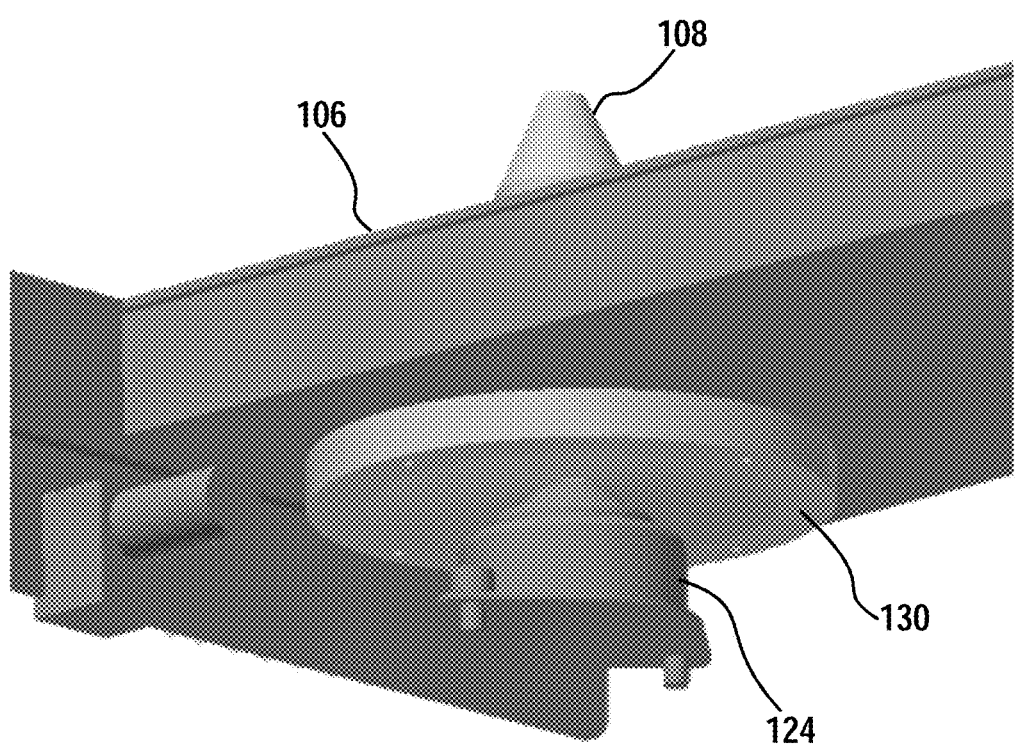
FIG. 5 is a close-up perspective view showing an example pad 130 supported by an example ball bearing 124, in accordance with implementations of the disclosure.

FIG. 5 is a close-up perspective view showing an example pad 130 supported by an example ball bearing 124, in accordance with implementations of the disclosure.

Figure 6:
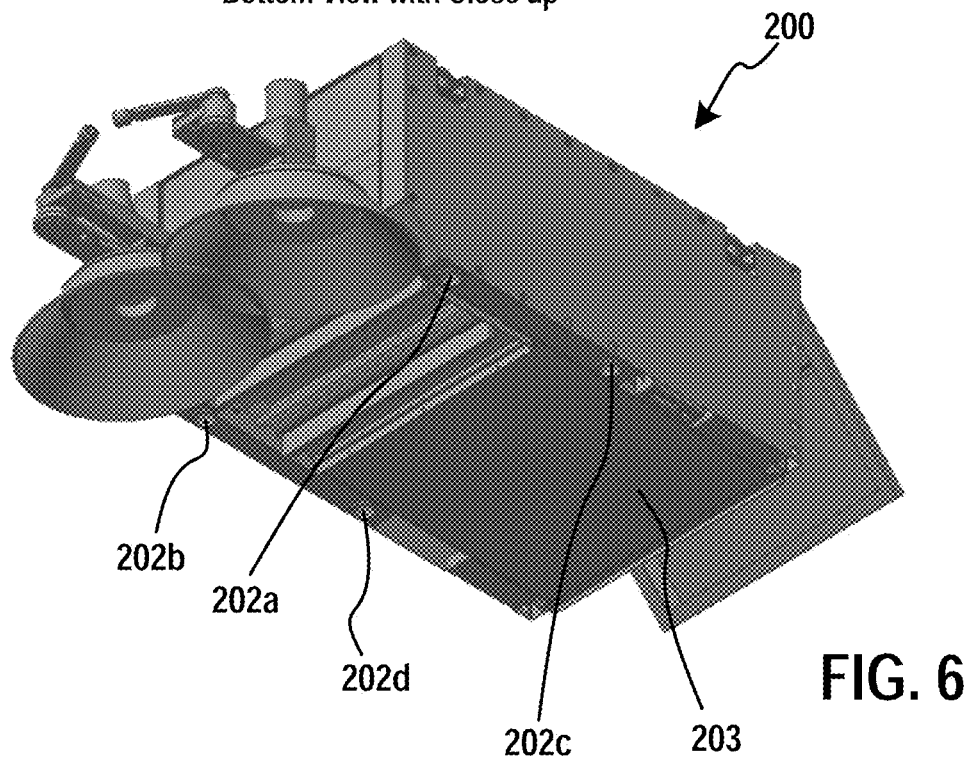
FIG. 6 is a perspective view showing the underside of a sweeper module 200, in accordance with implementations of the disclosure.

FIG. 6 is a perspective view showing the underside of a sweeper module 200, in accordance with implementations of the disclosure.

As shown, the underside of the sweeper module 200 includes various holes 202a, 202b, 202c, and 202d. The holes 202a, 202b, 202c, and 202d are configured for insertion of the cones 108a, 108b, 108c, and 108d, respectively. That is, when the sweeper module 200 is lowered by the robot onto the alignment platform 106, then the cones 108a, 108b, 108c, and 108d engage the respective holes 202a, 202b, 202c, and 202d on the underside of the sweeper module 200.

Also shown is a connector 203 that connects the sweeper module 200 to the connector 110 on the alignment platform 106.

Figure 7:
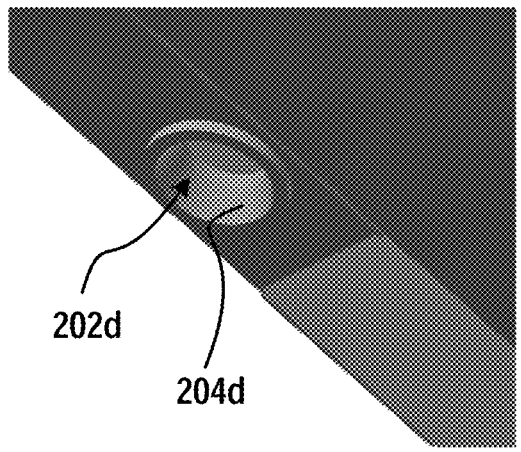
FIG. 7 is a close-up perspective view of the hole 202d on the underside of the sweeper module 200, in accordance with the implementation of FIG. 6.

FIG. 7 is a close-up perspective view of the hole 202d on the underside of the sweeper module 200, in accordance with the implementation of FIG. 6.

As shown, in some implementations, the hole 202d is formed by a hole fitting 204d, the hole fitting 204d being beveled to further guide the cone 108d when inserted into the hole 204d. It will be appreciated that the other holes are similarly constructed.

Figure 8:
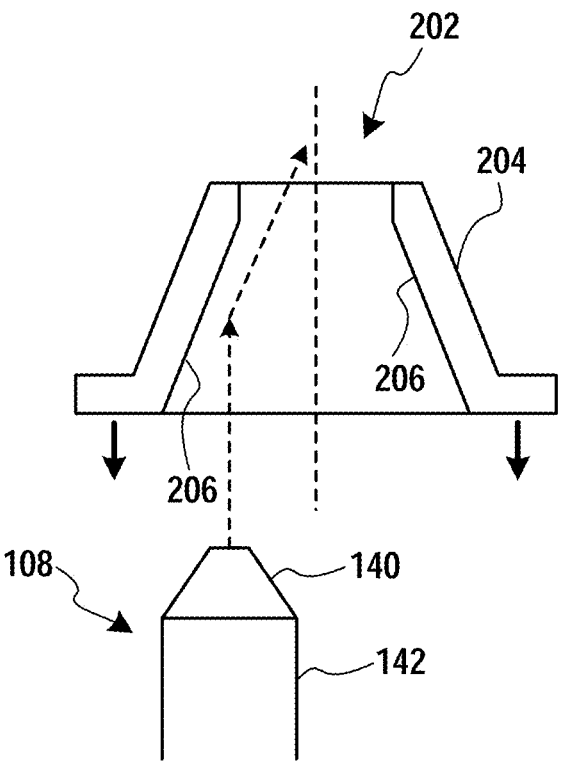
FIG. 8 illustrates a cutaway view of an exemplary hole 202 that is configured to be positioned on the underside of the sweeper 200, in accordance with implementations of the disclosure.

FIG. 8 illustrates a cutaway view of an exemplary hole 202 that is configured to be positioned on the underside of the sweeper 200, in accordance with implementations of the disclosure.

As shown, the hole 202 is defined by a hole fitting 204 having a beveled interior surface 206. Also shown in the illustrated implementation, is an exemplary cone 108. In some implementations, the cone 108 is defined having an upper section 140 that is substantially conically shaped, and a lower section 142 that is cylindrically shaped.

When the sweeper module 200 is lowered onto the alignment platform 106, the hole fitting 204 is lowered towards the cone 108. The substantially conically shaped upper section 140 of the cone 108, and the beveling of the hole fitting 202, provide tolerance for misalignment of the cone 108 to the hole 202, such that if the cone 108 is not aligned to the hole 202 (center of cone not aligned with center of hole), then when the cone 108 engages the hole 202, the cone 108 self-aligns to the hole 202 as shown. It will be appreciated that as the alignment platform 106 is moveable through the pads and ball bearings as previously described, then the self-alignment of the cones to the holes causes the alignment platform 106 to move.

Figure 9:
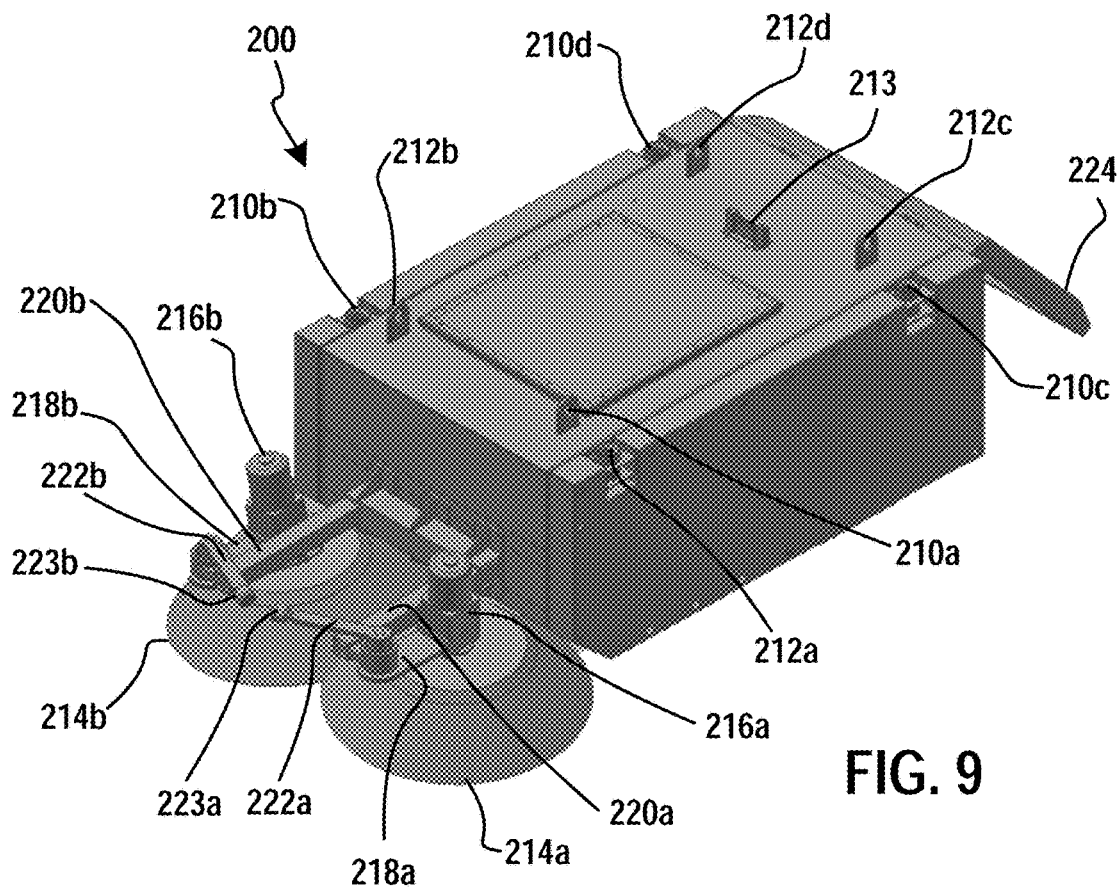
FIG. 9 illustrates a perspective view of the sweeper module 200, showing structures on the top side of the sweeper module 200, in accordance with implementations of the disclosure.

FIG. 9 illustrates a perspective view of the sweeper module 200, showing structures on the top side of the sweeper module 200, in accordance with implementations of the disclosure.

As shown, the sweeper module 200 includes several holes 210a, 210b, 210c, and 210d positioned on the top side of the sweeper module 200. In the illustrated implementation, the holes are positioned towards the corners on the top side of the sweeper module 200. As described in further detail below, the holes 210a, 210b, 210c, and 210d are engaged in order to align the sweeper module 200 to the robot when the sweeper module 200 is attached to the robot.

Figure 10:
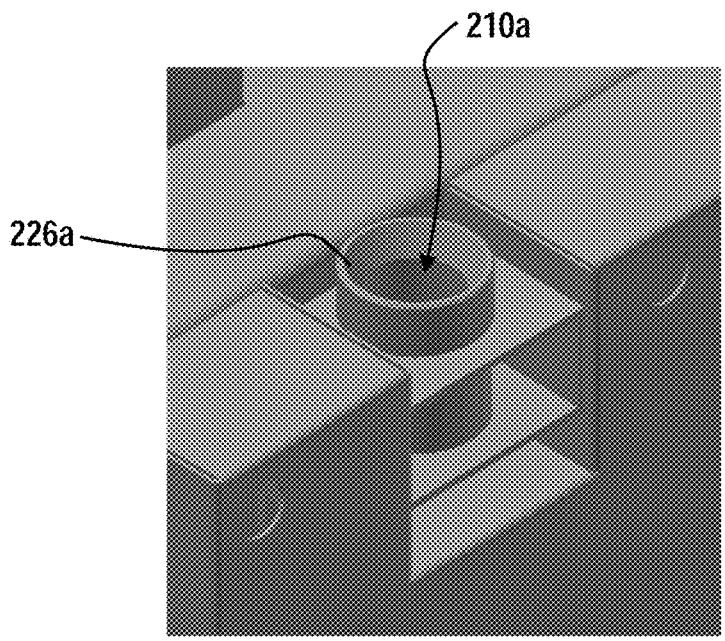
FIG. 10 illustrates a close-up perspective view of one of the holes on the top side of the sweeper module 200, in accordance with implementations of the disclosure.

FIG. 10 illustrates a close-up perspective view of one of the holes on the top side of the sweeper module 200, in accordance with implementations of the disclosure.

As shown, the hole 210a is formed by a hole fitting 226a. In some implementations, the hole fitting 226a has a beveled upper portion to promote self-alignment of the sweeper module 200 to the robot during acquisition of the sweeper module 200 by the robot, which provides additional tolerance when the hole is being engaged by the robot as described in further detail below. It will be appreciated that the other holes 210b, 210c, and 210d can be similarly configured, being formed by respective hole fittings, which may have beveled upper portions.

With continued reference to FIG. 9, the top side of the sweeper module 200 further includes brackets 212a, 212b, 212c, and 212d. The brackets 212a, 212b, 212c, and 212d are oriented as shown, and define through-holes for locking/latch pins as described below.

The sweeper module 200 includes rotatable brushes 214a and 214b for cleaning surfaces. The brushes 214a and 214b are rotated by motors 216a and 216b, respectively, when the sweeper module 200 is engaged in cleaning operations. The brushes 214a and 214b are positioned at the front of the sweeper module 200 and are mounted to swivel arms 218a and 218b, respectively. In the illustrated implementation, the brushes 214a and 214b are in a non-deployed state, such that the swivel arms and the brushes are folded inward. In some implementations, the swivel arms 218a and 218b are spring-loaded so as to fold inward into the non-deployed state as shown. The brushes are deployed when the robot moves into position over the sweeper module 200, pushing against lever arms 222a and 222b and thereby causing the swivel arms to swing outward and deploy the brushes 214a and 214b outward. In some implementations, the ends of the lever arms 222a and 222b have rollers 223a and 223b, respectively. The rollers 223a and 223b facilitate ease of movement up and down as the sweeper module 200 is raised and lowered within the robot 300. The lever arms 222a and 222b are connected to the swivel arms at respective joints. The brush deployment process is shown and described in further detail below.

A connector 213 is positioned on the top side of the sweeper module 200 for connection to the robot 300, facilitating communication between the robot 300 and the sweeper module 200.

The sweeper module 200 further includes a rear door 224 that can be opened, as shown in the illustrated view, for emptying of debris from the sweeper module 200.

Figure 11:
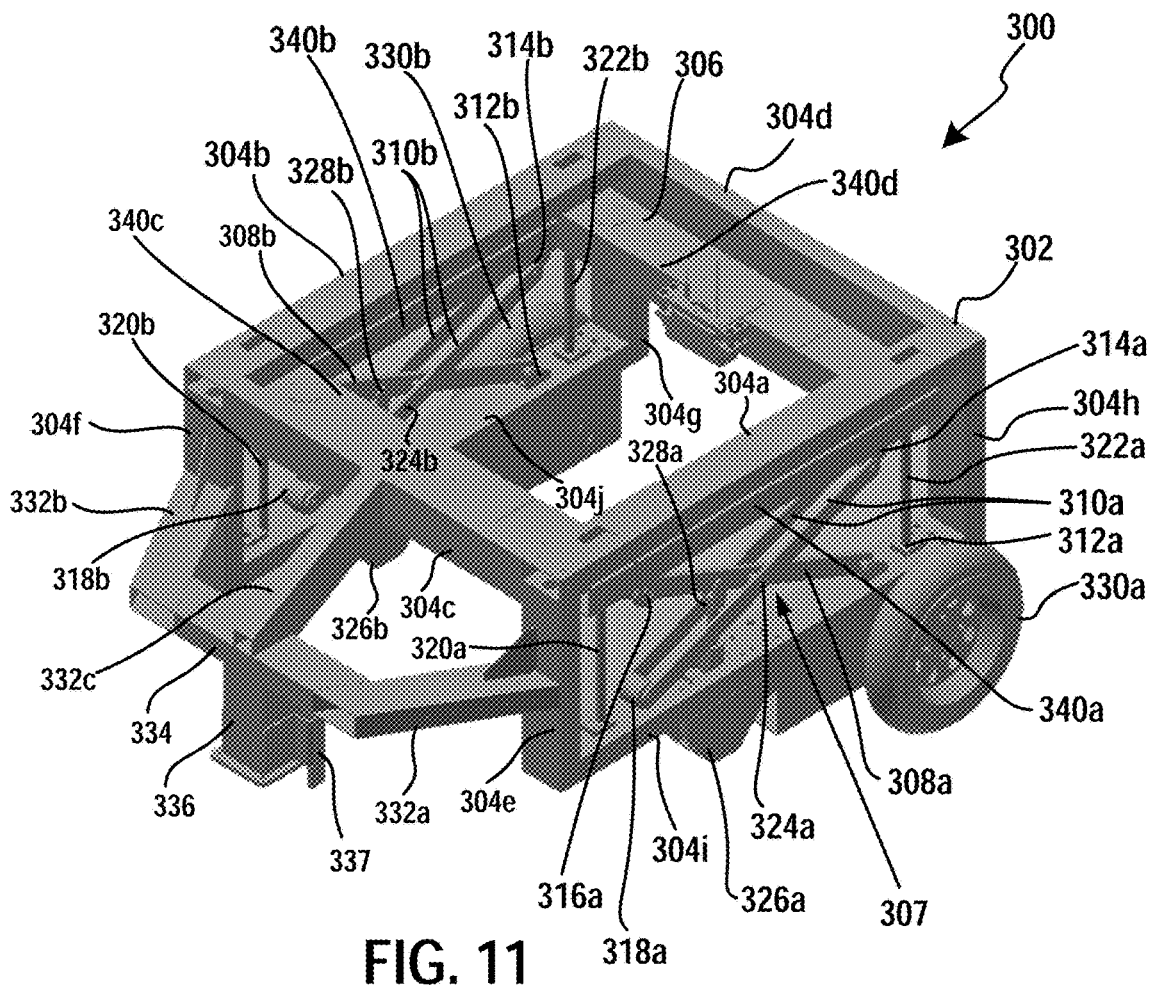
FIG. 11 illustrates a perspective view of a robot 300, in accordance with implementations of the disclosure.

FIG. 11 illustrates a perspective view of a robot 300, in accordance with implementations of the disclosure.

The robot 300 includes chassis 302 to which componentry is attached. In the illustrated implementation, the chassis 302 is in the form factor of a substantially box-shaped frame structure, though in other implementations, the chassis may have other form factors or structures. The chassis 302 as shown consists of several connected beams, including a left upper horizontal side beam 304a, a right upper horizontal side beam 304b, a front upper horizontal beam 304c (that connects the front ends of the side beams 304a and 304b), and a rear upper horizontal beam 304d (that connects the rear ends of the side beams 304a and 304b). The chassis 302 further includes a left lower horizontal side beam 304i (disposed below, and aligned with, side beam 304a) and a right lower horizontal side beam 304j (disposed below, and aligned with, side beam and 304b). Vertical beams 304e and 304h connect the front and rear ends of side beam 304i to the front and rear ends of side beam 304a, respectively; vertical beams 304f and 304g connect the front and rear ends of side beam 304j to the front and rear ends of side beam 304b, respectively.

The robot 300 includes a scissor lifting mechanism 307 for lifting and lowering the sweeper module 200 within the interior volume of the robot 300. Broadly speaking, the scissor lifting mechanism 307 lifts and lowers a lift frame 306, with the lift frame 306 being configured to attach and secure the sweeper module 200 to the lift frame 306. As shown, the robot 300 includes scissor lifts on both left and right sides, that operate in unison to control the height of the lift frame 306.

Figure 12A:
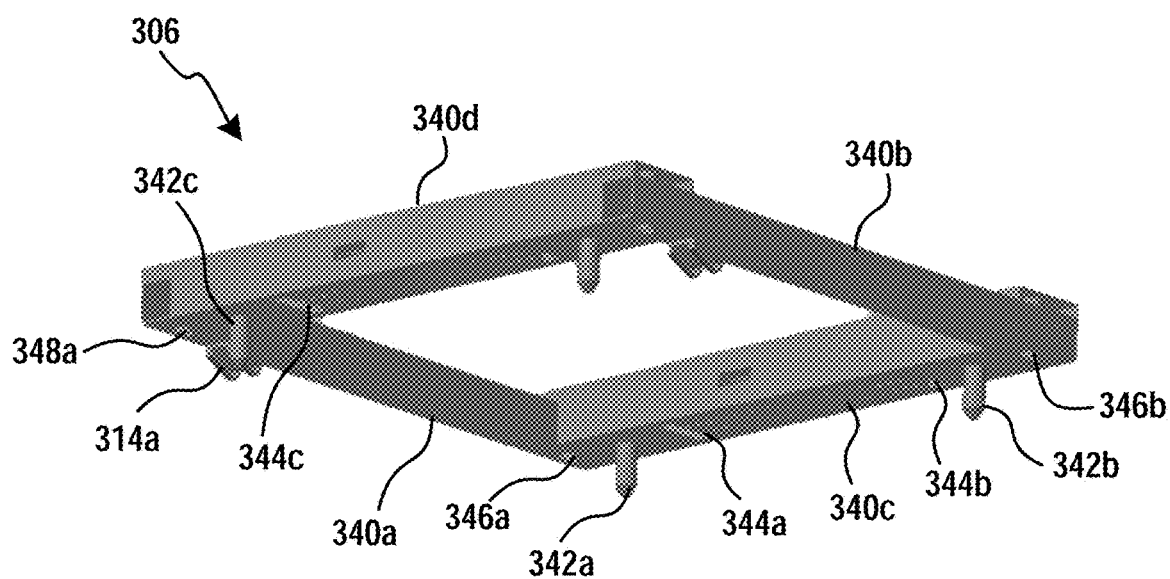
FIGS. 12A and 12B provide perspective views of the lift frame 306, showing the structures along the underside of the lift frame 306, in accordance with implementations of the disclosure.
Figure 12B:
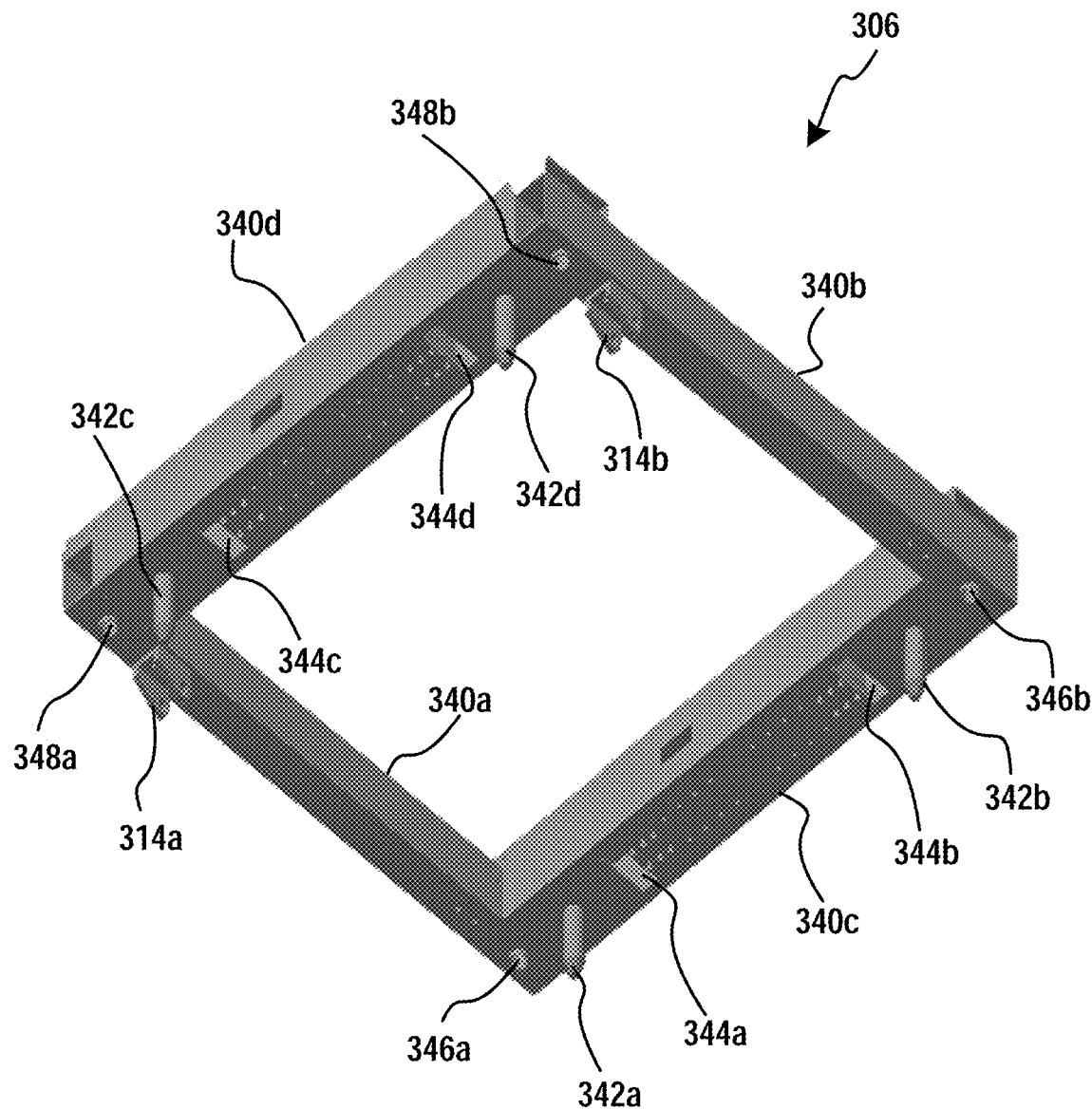

FIGS. 12A and 12B provide perspective views of the lift frame 306, showing the structures along the underside of the lift frame 306, in accordance with implementations of the disclosure.

As shown, the lift frame 306 is substantially rectangular in shape, formed by a left side beam 340a and a right side beam 340b that are oriented longitudinally (front to back), as well as a front beam 340c (connecting the front ends of the side beams 340a and 340b) and a rear beam 340d (connecting the rear ends of the side beams 340a and 340b) that are oriented transversely (side to side).

A bracket 314a is positioned on the underside towards the rear end of the left side beam 340a; and a bracket 314b is positioned on the underside towards the rear end of the right side beam 340b. Pegs 342a and 342b are disposed on the underside at opposite ends of the front beam 340c; and pegs 342c and 342d are disposed on the underside at opposite ends of the rear beam 340d. The pegs 342a, 342b, 342c and 342d protrude downward from the front and rear beams, and are configured to engage the holes 210a, 210b, 210c and 210d respectively on the top of the sweeper module 200. As shown, the pegs have substantially conically shaped tips which provide tolerance when engaging the holes, allowing for engagement when the pegs are not aligned or off center with respect to the holes. This tolerance effect is similar to that described with respect to the cone 108 as shown and discussed with reference to FIG. 8. It will be appreciated that when the pegs 342a/b/c/d engage the holes 210a/b/c/d, the peg engagement may cause the sweeper module 200 to move (e.g. laterally or rotationally) as it is supported by the alignment platform 106, with the alignment platform 106 accommodating such movement through its pads and underlying ball bearings as previously discussed.

The lift frame 306 further includes holes 344a and 344b which are formed on the underside of the front beam 340c, as well as holes 344c and 344d which are formed on the underside of the rear beam 340d. The holes 344a, 344b, 344c, and 344d accommodate the brackets 212a, 212b, 212c, and 212d when the lift frame 306 is lowered onto the sweeper module 200, facilitating locking of the sweeper module 200 to the lift frame 306 as described in further detail below.

Now describing the left side scissor lift with continued reference to FIG. 11, a scissor arm 308a is connected to the left lower horizontal side beam 304i by a bracket 312a that forms a pivot point for the scissor arm 308a. Another scissor arm 310a is connected to the left side beam 340a of the lift frame 306 by a bracket 314a that forms a pivot point for the scissor arm 310a. The approximate midpoints of the scissor arms 308a and 310a are connected to each other by a pin 324a that forms a joint between the scissor arms 308a and 310a. It is noted that the scissor arm 310a as shown is in the form of a double beam, so that the scissor arm 308a passes through the double beam of the scissor arm 310a. A roller 316a is attached to the end of the scissor arm 308a opposite the bracket 312a, the roller 316a configured to roll along the underside of the side beam 340a of the lift frame 306. A roller 318a is attached to the end of the scissor arm 310a opposite the bracket 314a, the roller 318a configured to roll along the top side of the left lower horizontal side beam 304i.

An actuator 326a raises and lowers a rod 328a that connects to the scissor arm 308a, thereby raising and lowering the left side scissor lift. In some implementations, the actuator 326a is configured to pivot, and the connection of the rod 328a to the scissor arm 308a is also configured to pivot (e.g. forming a joint), to account for the movement of the scissor arm 308a as it is being raised or lowered by the actuator 326a. It will be appreciated that during raising of the scissor lift using the actuator 326a, the connection point of the rod to the 328a to the scissor arm 308a moves not only vertically upward, but also horizontally rearward. Hence, the provision of mechanisms to enable the actuator 326a and the rod 328a to pivot/rotate allows for this non-linear movement.

Now describing the right side scissor lift with continued reference to FIG. 11, a scissor arm 308b is connected to the right lower horizontal side beam 304j by a bracket 312b that forms a pivot point for the scissor arm 308b. Another scissor arm 310b is connected to the right side beam 340b of the lift frame 306 by a bracket 314b that forms a pivot point for the scissor arm 310b. The approximate midpoints of the scissor arms 308b and 310b are connected to each other by a pin 324b that forms a joint between the scissor arms 308b and 310b. It is noted that the scissor arm 310b as shown is in the form of a double beam, so that the scissor arm 308b passes through the double beam of the scissor arm 310b. A roller 316b is attached to the end of the scissor arm 308b opposite the bracket 312b, the roller 316b configured to roll along the underside of the side beam 340b of the lift frame 306. A roller 318b is attached to the end of the scissor arm 310b opposite the bracket 314b, the roller 318b configured to roll along the top side of the right lower horizontal side beam 304j.

An actuator 326b raises and lowers a rod 328b that connects to the scissor arm 308b, thereby raising and lowering the left side scissor lift. In some implementations, the actuator 326b is configured to pivot, and the connection of the rod 328b to the scissor arm 308b is also configured to pivot (e.g. forming a joint), to account for the movement of the scissor arm 308b as it is being raised or lowered by the actuator 326b. It will be appreciated that during raising of the scissor lift using the actuator 326b, the connection point of the rod to the 328b to the scissor arm 308b moves not only vertically upward, but also horizontally rearward. Hence, the provision of mechanisms to enable the actuator 326b and the rod 328b to pivot/rotate allows for this non-linear movement.

In order to maintain horizontal alignment of the lift frame 306, the corners of the lift frame include through-holes 346a, 346b, 348a, and 348b, as shown at FIG. 12A/12B. As shown at FIG. 11, vertical rods 320a and 322a are mounted and connect between the left upper horizontal beam 304a and the left lower horizontal beam 304i; and vertical rods 320b and 322b are mounted and connect between the right upper horizontal beam 304b and the right lower horizontal beam 304j. The vertical rods 320a and 322a pass through the through-holes 346a and 348a; and the vertical rods 320b and 322b pass through the through-holes 346b and 348b. As the lift frame 306 is raised and lowered, the vertical rods act as guides for the lift frame 306, securing and maintaining horizontal alignment of the lift frame 306.

The front of the robot 300 includes a front sub-assembly consisting of front protruding beams 332a, 332b, and 332c, that connect to a transverse beam 334, to which a vertical beam 336 is attached and extends downward. In some implementations, a front wheel 338 (shown at FIG. 13A) is attached to the bottom of the vertical beam 336, for supporting the front end of the robot 300. In some implementations, an internally facing bumper plate 337 is mounted to the rear side of the vertical beam 336. The bumper plate 337 is configured for the lever arms 222a/222b of the sweeper module 200 to push against for deployment of the brushes 214a/214b.

Figure 13A:
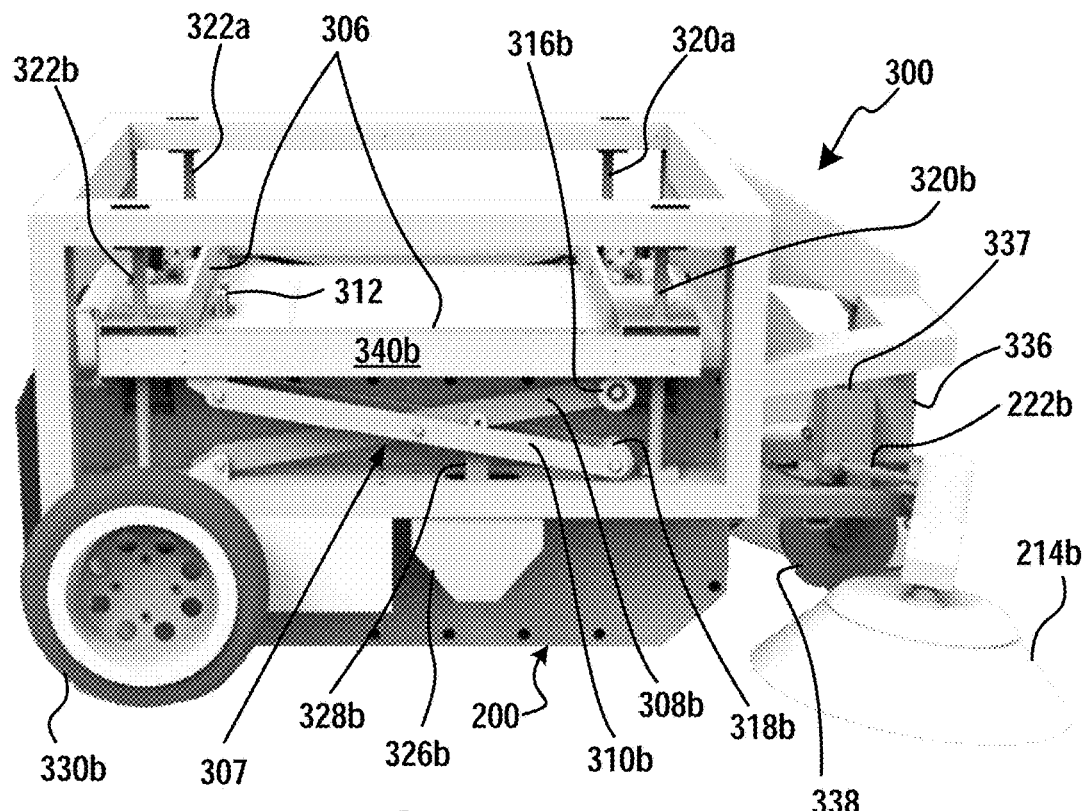
FIG. 13A illustrates a side perspective view of the robot 300 and sweeper module 200, with the scissor lifting system in a lowered position, in accordance with implementations of the disclosure.

FIG. 13A illustrates a side perspective view of the robot 300 and sweeper module 200, with the scissor lifting system in a lowered position, in accordance with implementations of the disclosure.

Figure 13B:
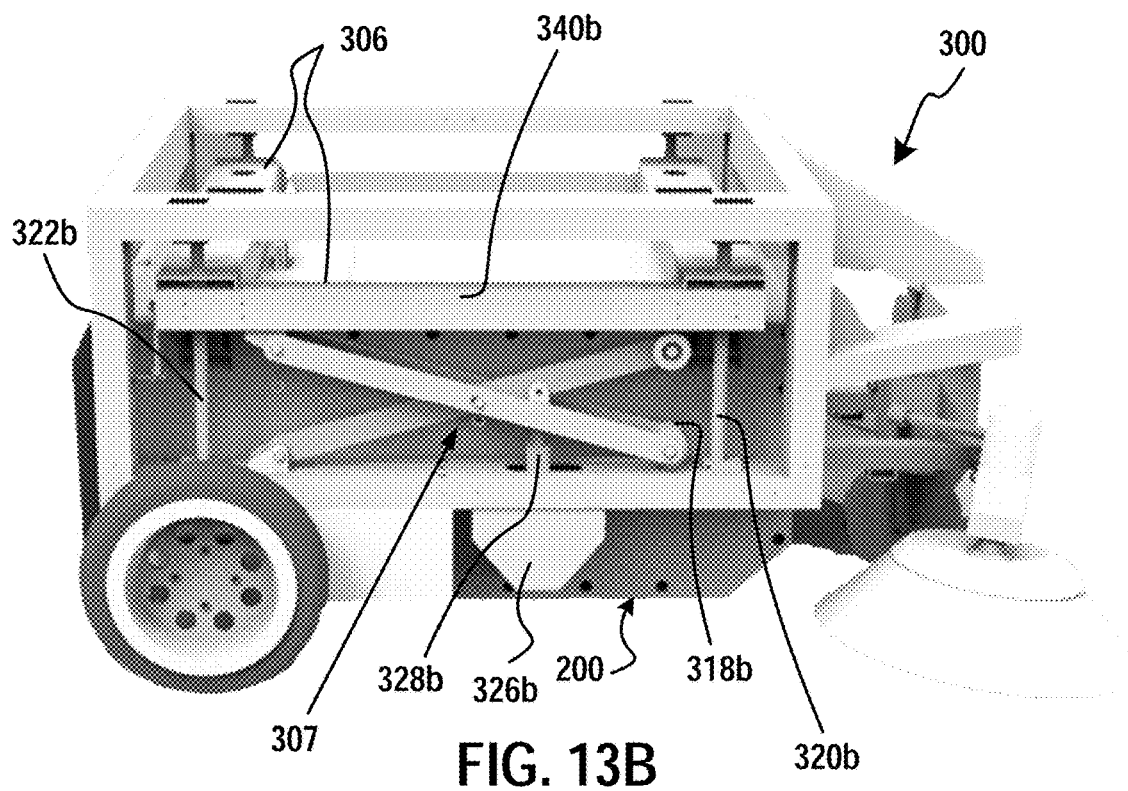
FIG. 13B illustrates a side perspective view of the robot 300 and sweeper module 200, with the scissor lifting system in a raised position, in accordance with implementations of the disclosure.

FIG. 13B illustrates a side perspective view of the robot 300 and sweeper module 200, with the scissor lifting system in a raised position, in accordance with implementations of the disclosure.

Figure 13C:
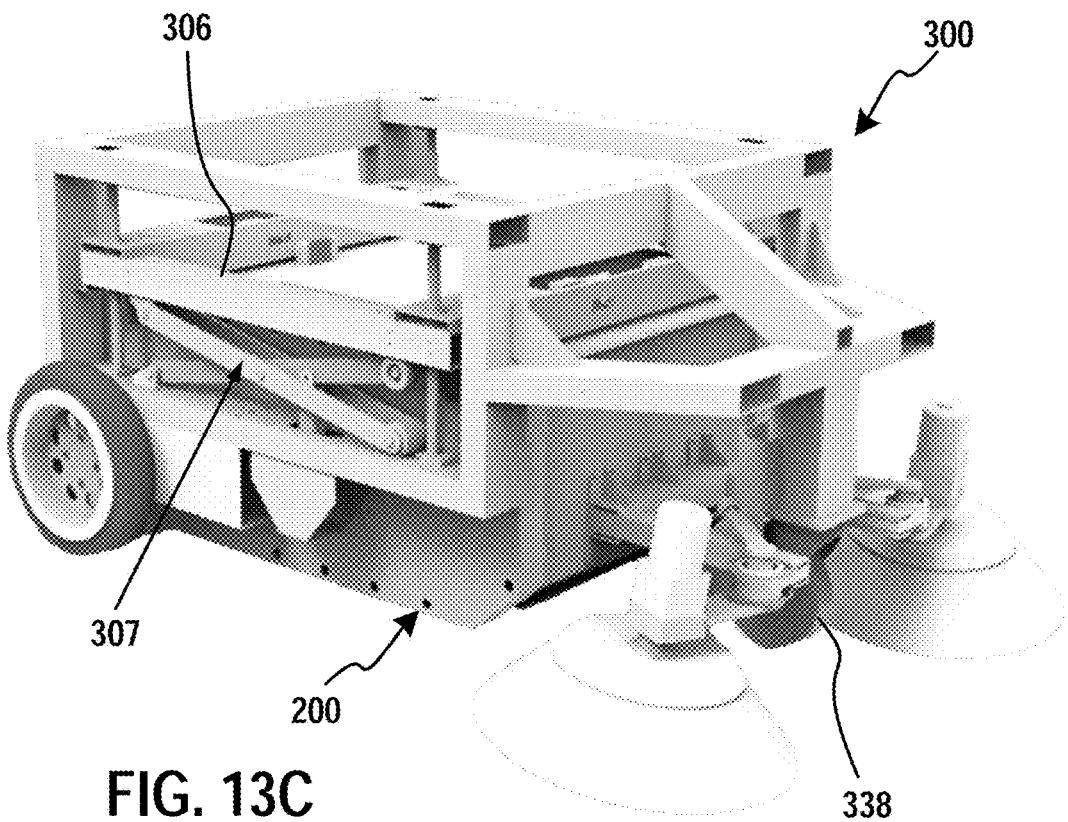
FIG. 13C illustrates a front corner perspective view of the robot 300 and sweeper module 200, with the scissor lifting system in a lowered position, in accordance with implementations of the disclosure.

FIG. 13C illustrates a front corner perspective view of the robot 300 and sweeper module 200, with the scissor lifting system in a lowered position, in accordance with implementations of the disclosure.

Figure 13D:
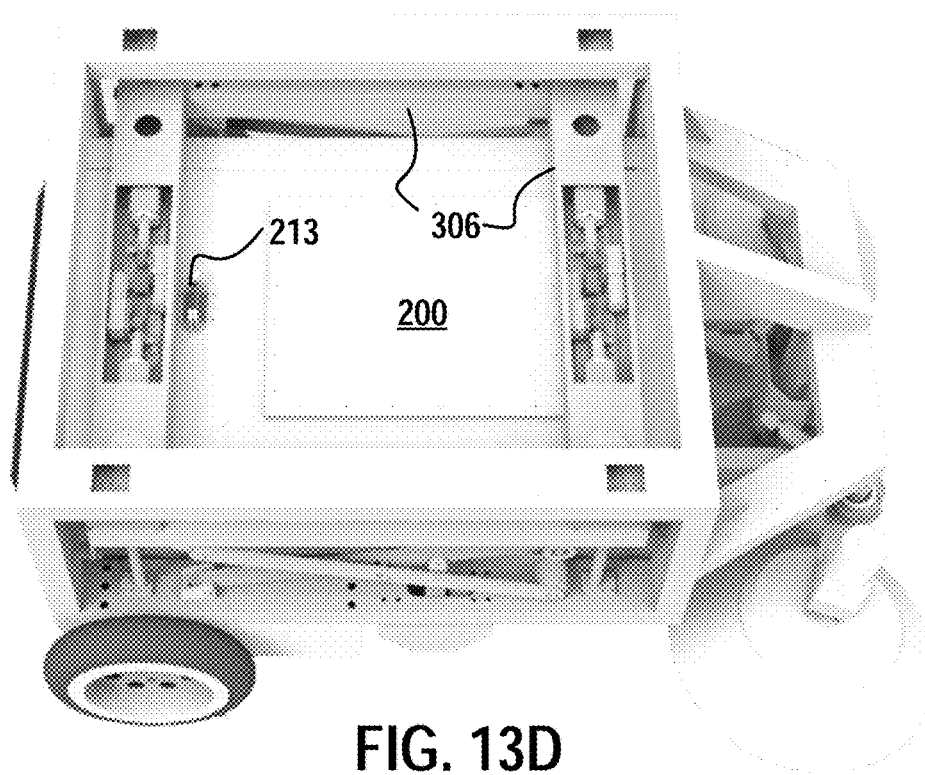
FIG. 13D illustrates an overhead perspective view of the robot 300 and sweeper module 200, in accordance with implementations of the disclosure.

FIG. 13D illustrates an overhead perspective view of the robot 300 and sweeper module 200, in accordance with implementations of the disclosure.

Figure 13E:
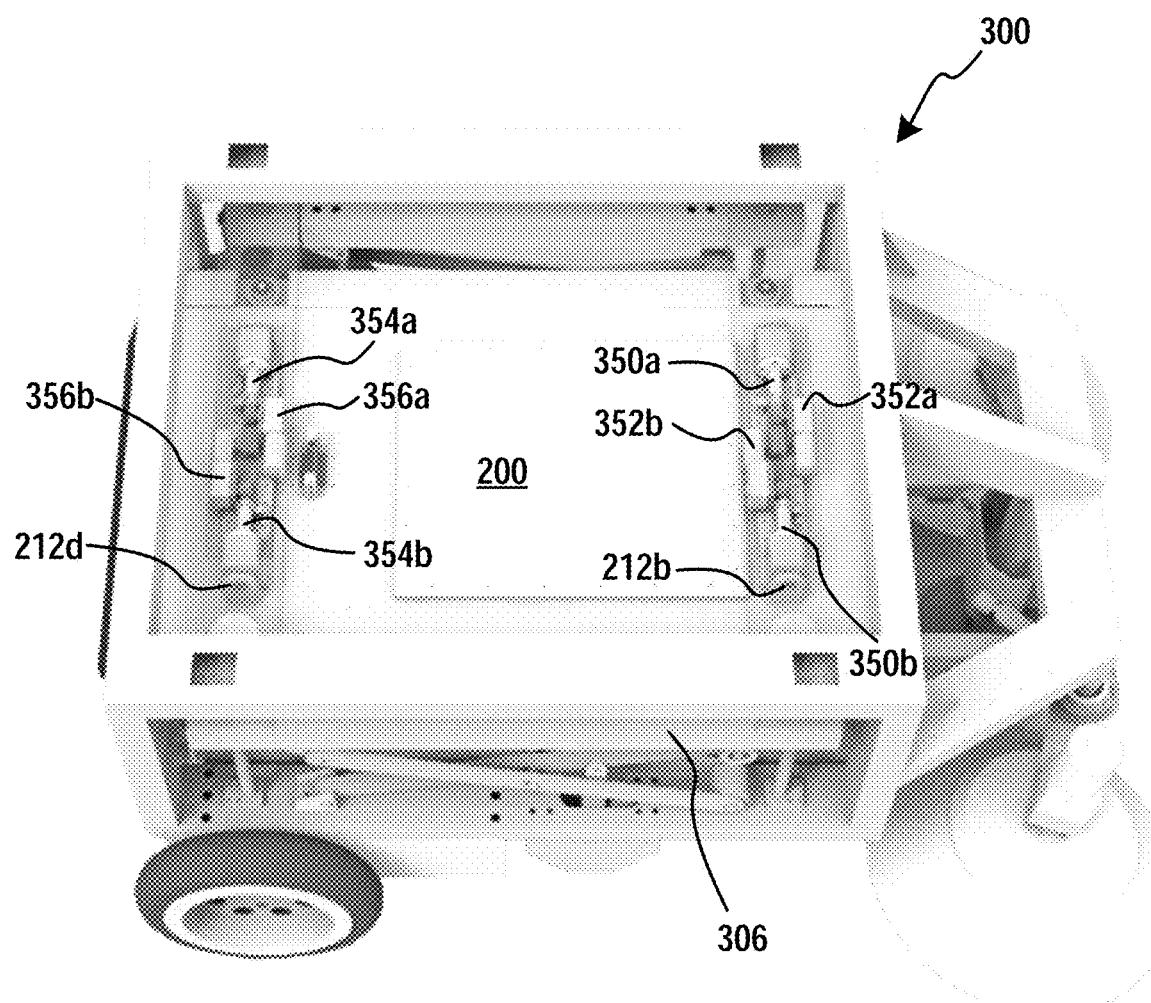
FIG. 13E illustrates an overhead perspective view of the robot 300 and sweeper module 200, in accordance with implementations of the disclosure.

FIG. 13E illustrates an overhead perspective view of the robot 300 and sweeper module 200, in accordance with implementations of the disclosure.

In the illustrated implementation of FIG. 13E, the front and rear beams 340c/340d of the lift frame 306 have been rendered transparent so as to reveal the locking/latch pin mechanism within the front and rear beams 340c/340d.

Within the front beam 340c, is a latch pin 350a that is controlled by an actuator 352a, and a latch pin 350b that is controlled by an actuator 350b. Within the rear beam 340d, is a latch pin 354a that is controlled by an actuator 356a, and a latch pin 354b that is controlled by an actuator 356b.

Figure 14B:
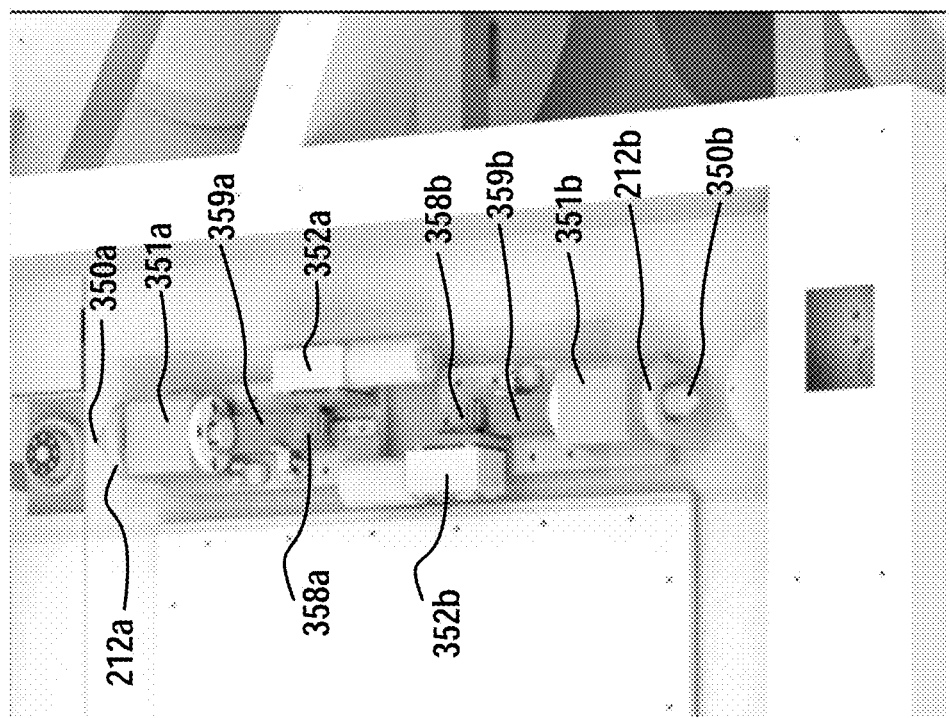
FIGS. 14A and 14B illustrate close-up overhead perspective views of the latch pin mechanism within the front beam 340c, in unlocked and locked configurations, in accordance with implementations of the disclosure.
Figure 14A:
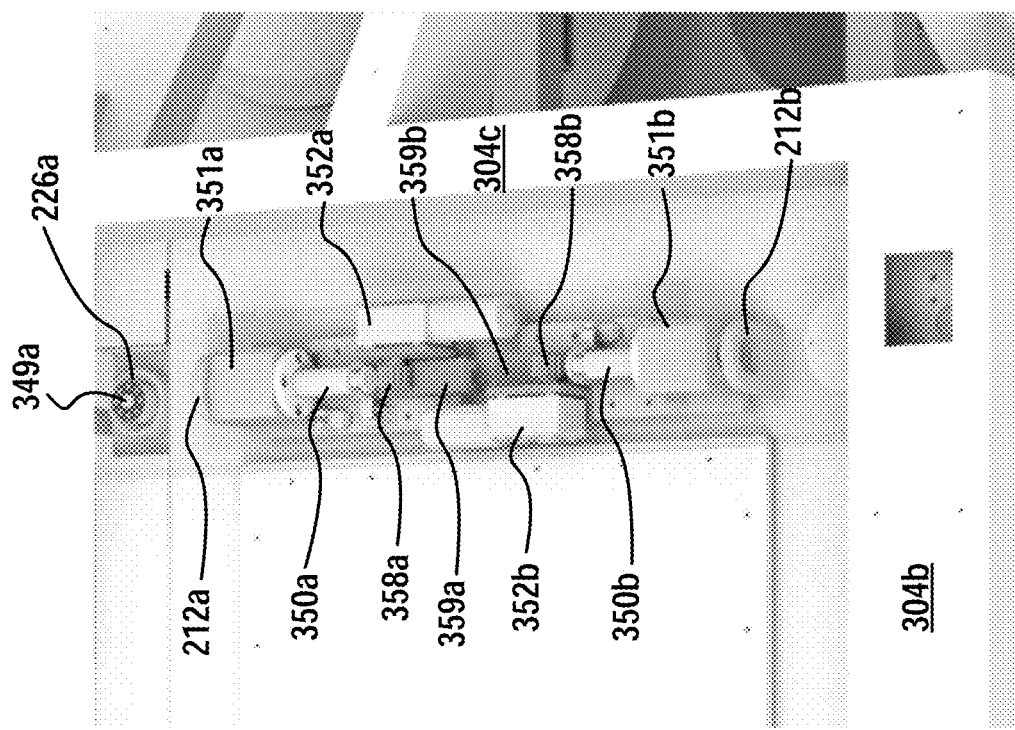

FIGS. 14A and 14B illustrate close-up overhead perspective views of the latch pin mechanism within the front beam 340c, in unlocked and locked configurations, in accordance with implementations of the disclosure.

In the illustrated implementation, the latch pin 350a is controlled by a rack and pinion system in which the actuator 352a rotates a circular gear 358a to drive the movement of a linear gear 359a which is connected to the latch pin 350a. The latch pin 350b is similarly controlled by the actuator 352b, which rotates a circular gear 358b to drive the movement of a linear gear 359b which is connected to the latch pin 350b. The alignment of the latch pin 350a is maintained by a horizontal guide 351a through which the latch pin 350a is driven; and the alignment of the latch pin 350b is maintained by a horizontal guide 351b through which the latch pin 350b is driven.

When the lift frame 306 is lowered onto the sweeper module 200 (as it is supported on the alignment platform 106 of the dock assembly 100), the brackets 212a and 212b, as shown, protrude into the front beam 340c of the lift frame 306. FIG. 14A illustrates the locking/latch mechanism in an unlocked configuration, such that the pins 350a/350b do not extend through the holes in the brackets 212a/212b. In order to secure the sweeper module 200 to the lift frame 306, the pins 350a/350b are driven through the holes in the brackets 212a/212b to achieve a locked configuration as shown at FIG. 14B. It will be appreciated that the lift pin mechanism is similarly configured within the rear beam 340d of the lift frame 306.

With the lift pins 212a/212b/212c/212d extending through the holes in the brackets 212a/212b/212c/212d, then when the lift frame 306 is raised by the scissor lifting mechanism, so the sweeper module 200 is raised from the underlying alignment platform 106 of the dock assembly 100, so that it can be moved off of the dock assembly 100 by the robot 300 to carry out sweeping operations.

Figure 15A:
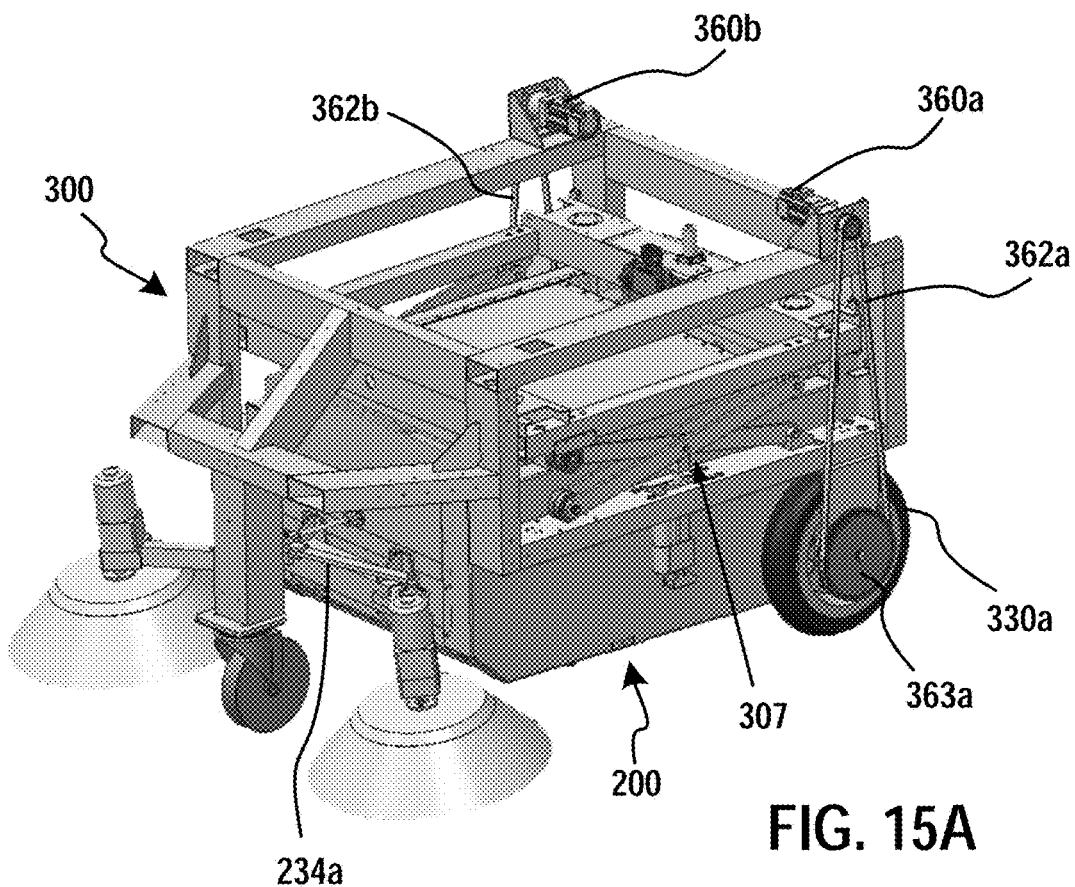
FIG. 15A illustrates a perspective view of a robot 300 and sweeper module 200, in accordance with implementations of the disclosure.

FIG. 15A illustrates a perspective view of a robot 300 and sweeper module 200, in accordance with implementations of the disclosure.

In the illustrated implementation, the rear wheels are belt-driven. More specifically as shown, the left rear wheel 330a is driven by a motor 360a via a belt 362a that turns pulley 363a. The right rear wheel (not shown) is driven by a motor 360b via a belt 362b that turns a pulley (not shown). It will be appreciated that as the wheels are independently driven, and with a single front wheel, the robot 300 is capable of turning and rotating, enabling highly agile maneuvering. In FIG. 15A, the scissor lift mechanism 307 is shown in a lowered position.

Figure 15B:
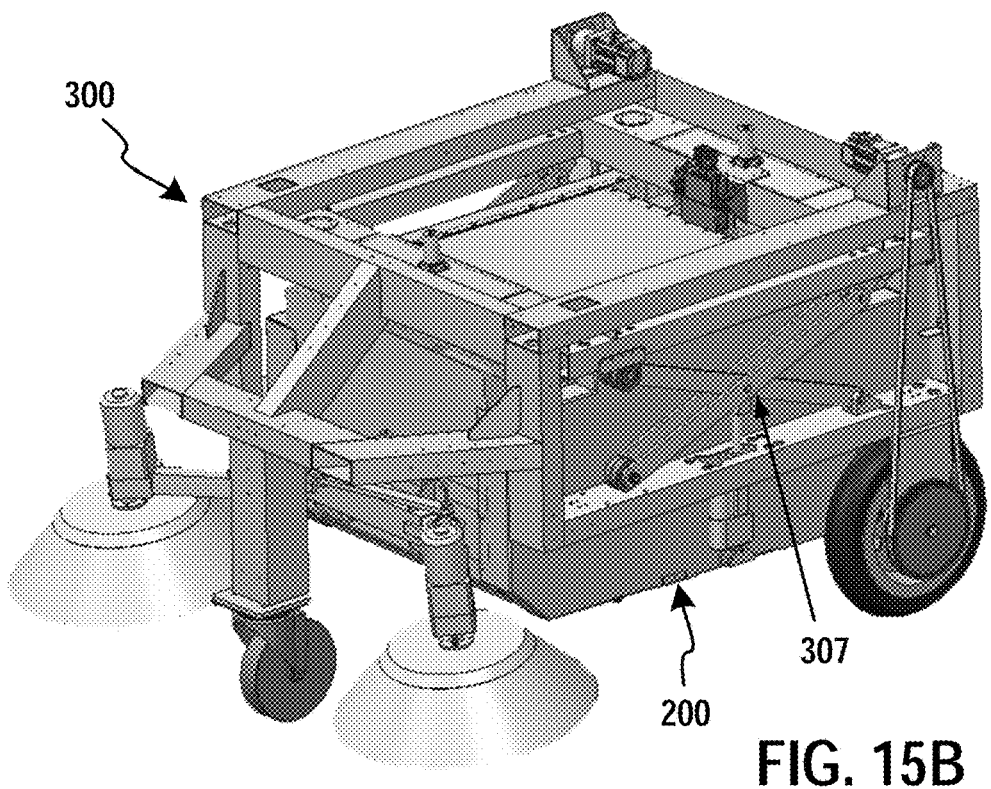
FIG. 15B illustrates a perspective view of the robot 300 and sweeper module 200, with the scissor lift mechanism in a raised position, in accordance with the implementation of FIG. 15A.

FIG. 15B illustrates a perspective view of the robot 300 and sweeper module 200, with the scissor lift mechanism in a raised position, in accordance with the implementation of FIG. 15A.

Figure 16A:
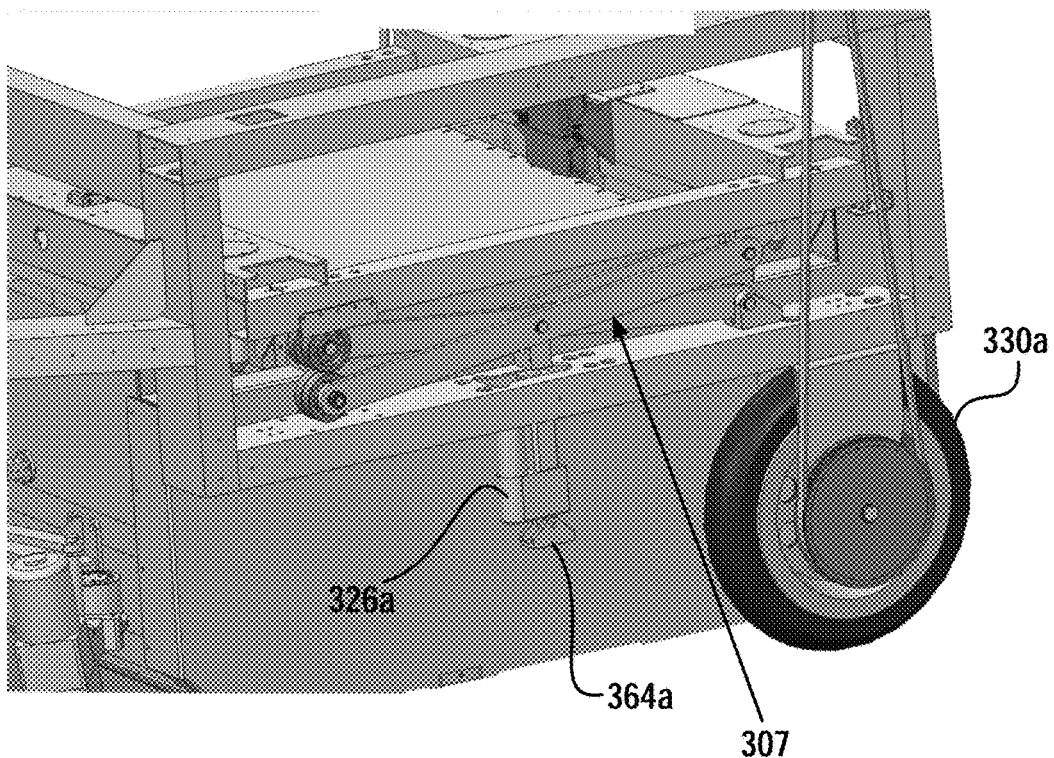
FIGS. 16A, 16B, and 16C illustrate close-up views of the scissor lift mechanism of the robot 300, in accordance with the implementation of FIG. 15A.
Figure 16B:
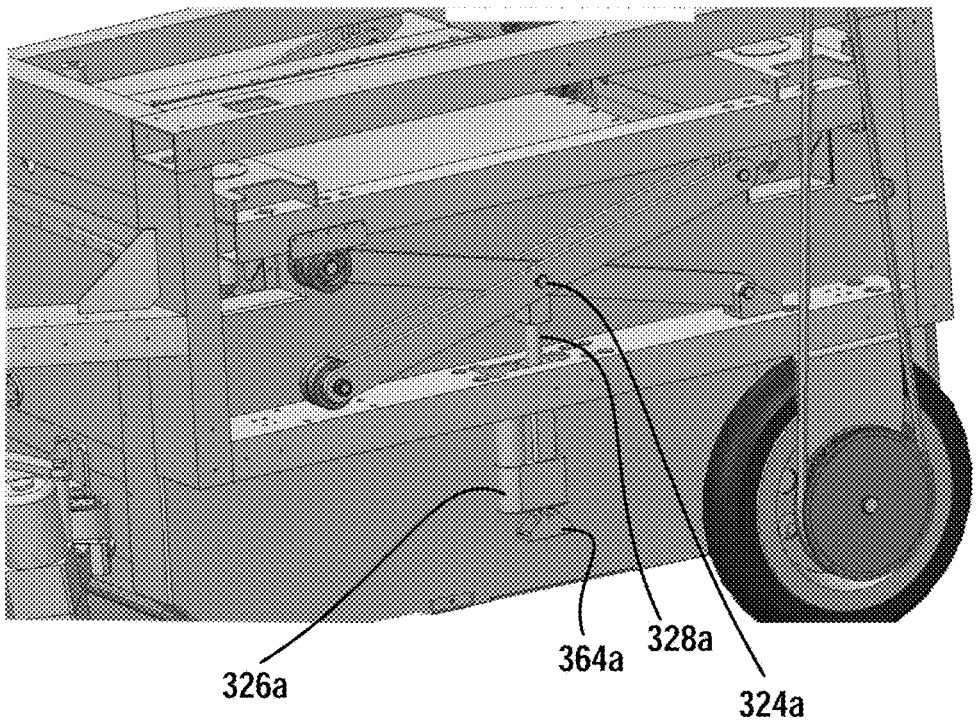
Figure 16C:
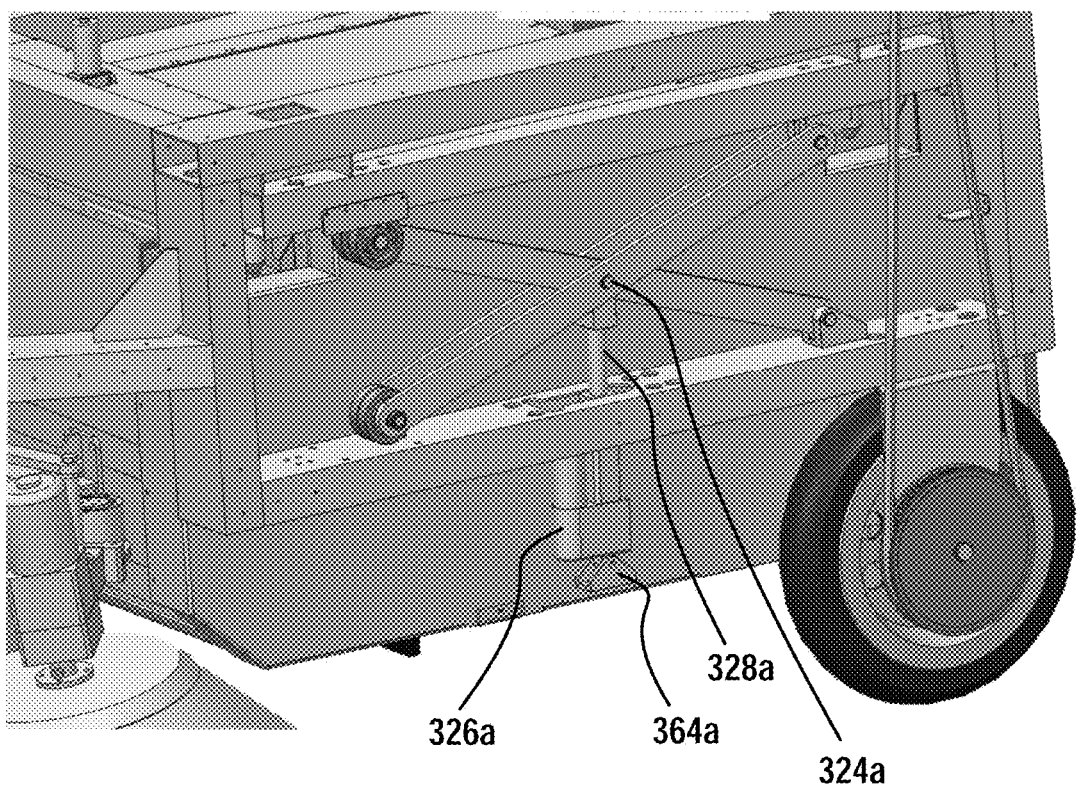

FIGS. 16A, 16B, and 16C illustrate close-up views of the scissor lift mechanism of the robot 300, in accordance with the implementation of FIG. 15A.

As shown, the rod 328a is connected to the scissor arms at the point of their intersection, and more specifically, the rod 328a is connected to the pin 324a that forms the joint between the scissor arms 308a and 310a. In the illustrated implementation, FIGS. 16A, 16B, and 16C show the scissor lift mechanism in lowered, intermediate, and raised positions, respectively.

Figure 17A:
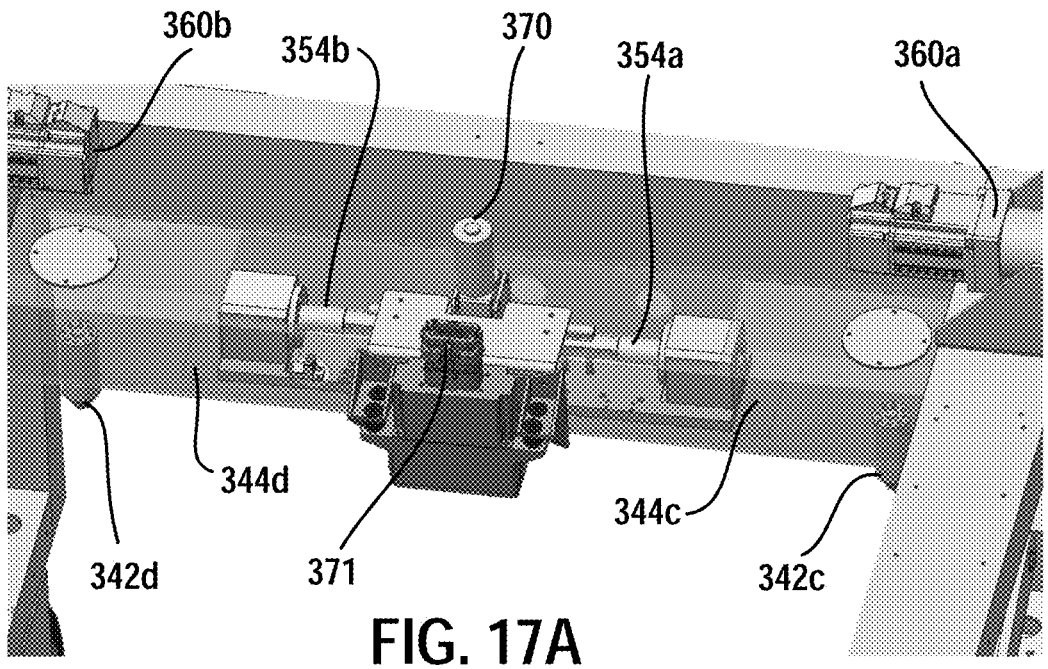
FIGS. 17A, 17B, and 17C illustrate perspective views of the latch pin mechanism in accordance with the implementation of FIG. 15A.
Figure 17B:
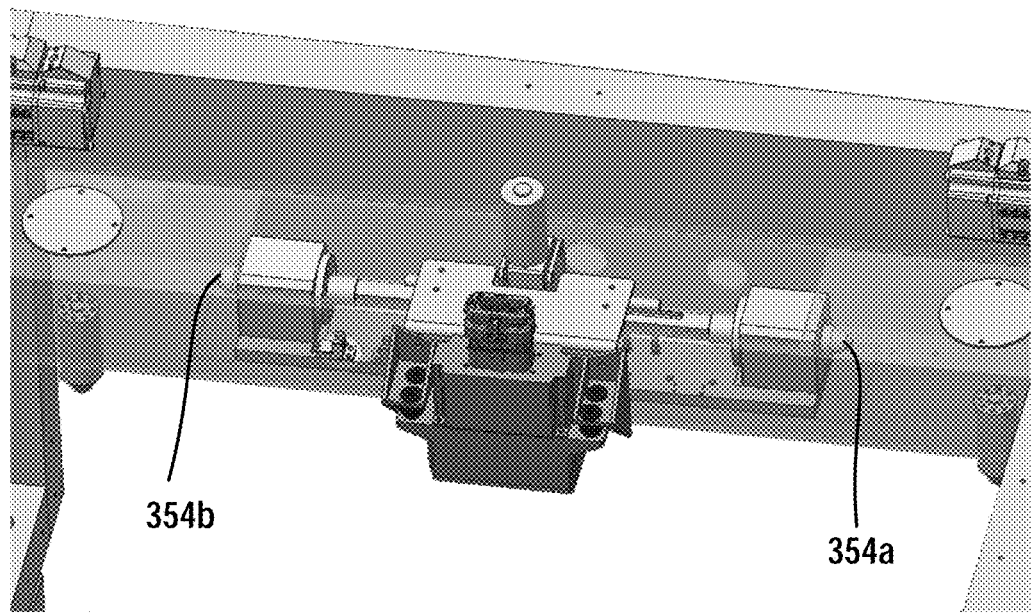
Figure 17C:
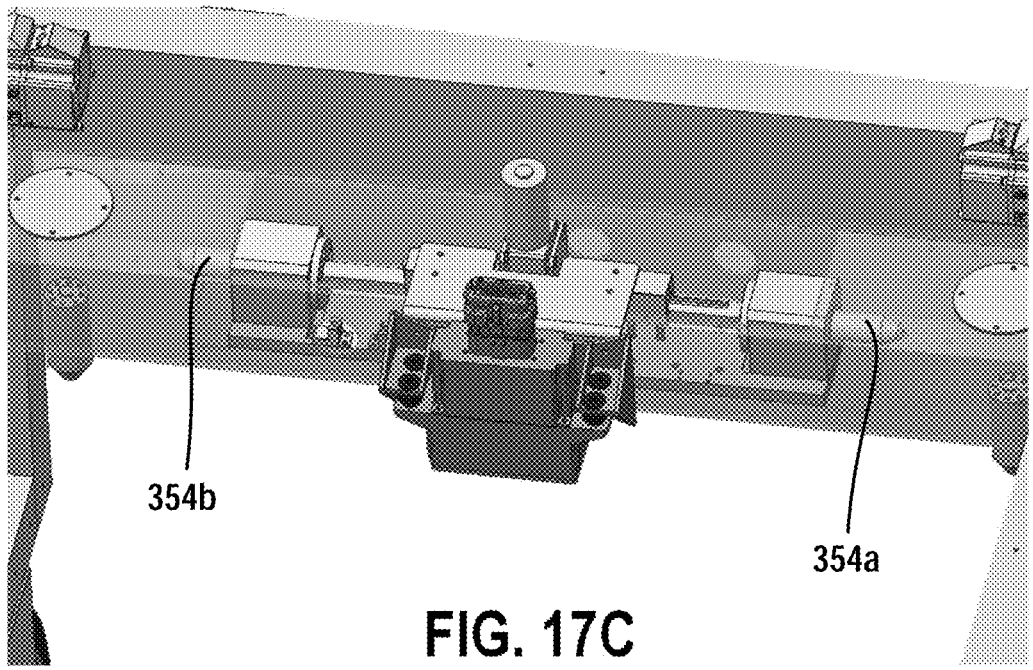

FIGS. 17A, 17B, and 17C illustrate perspective views of the latch pin mechanism in accordance with the implementation of FIG. 15A.

In the illustrated implementation, the latch pins 354a and 354b are driven by a single actuator 370. The rear beam 340d is shown in translucent rendering to reveal its structure and the components within or connected to the rear beam 340d, including the holes 344c/344d and pins 342c/342d. FIGS. 17A, 17B, and 17C illustrate the latch pins in non-extended (unlocked), partially extended, and fully extended (locked) configurations.

Also shown is a connector 371 that connects to the sweeper module 200 to enable communication between the robot 300 and the sweeper module 200.

Figure 18A:
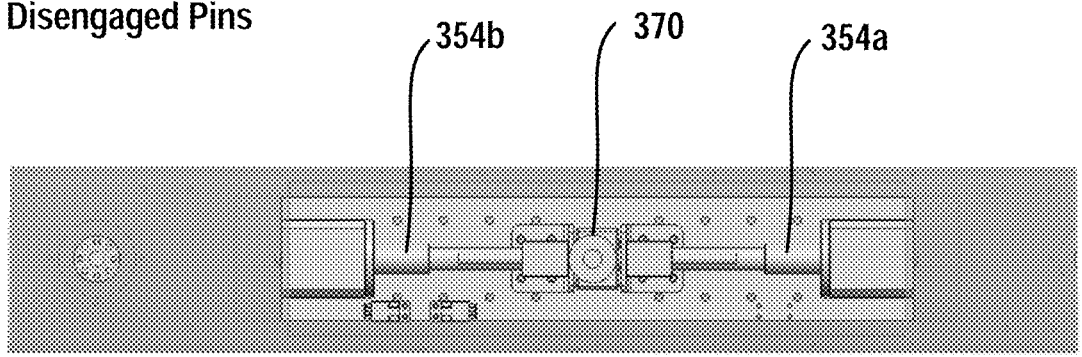
FIGS. 18A, 18B, and 18C illustrate overhead views of the latch pin mechanism in accordance with the implementation of FIG. 15A.
Figure 18B:
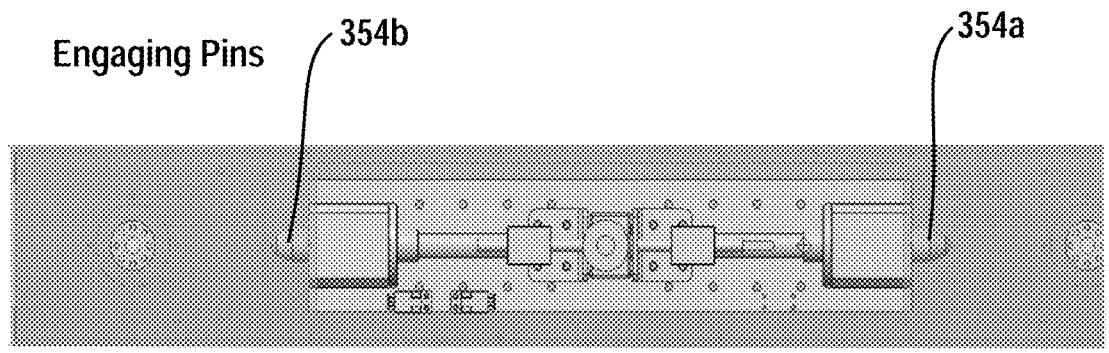
Figure 18C:
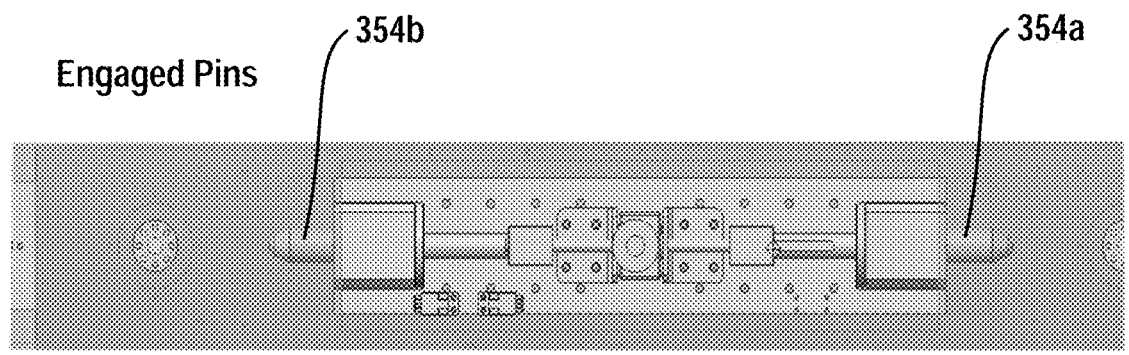

FIGS. 18A, 18B, and 18C illustrate overhead views of the latch pin mechanism in accordance with the implementation of FIG. 15A.

FIGS. 18A, 18B, and 18C illustrate the latch pins in non-extended (unlocked), partially extended, and fully extended (locked) configurations.

Figure 19A:
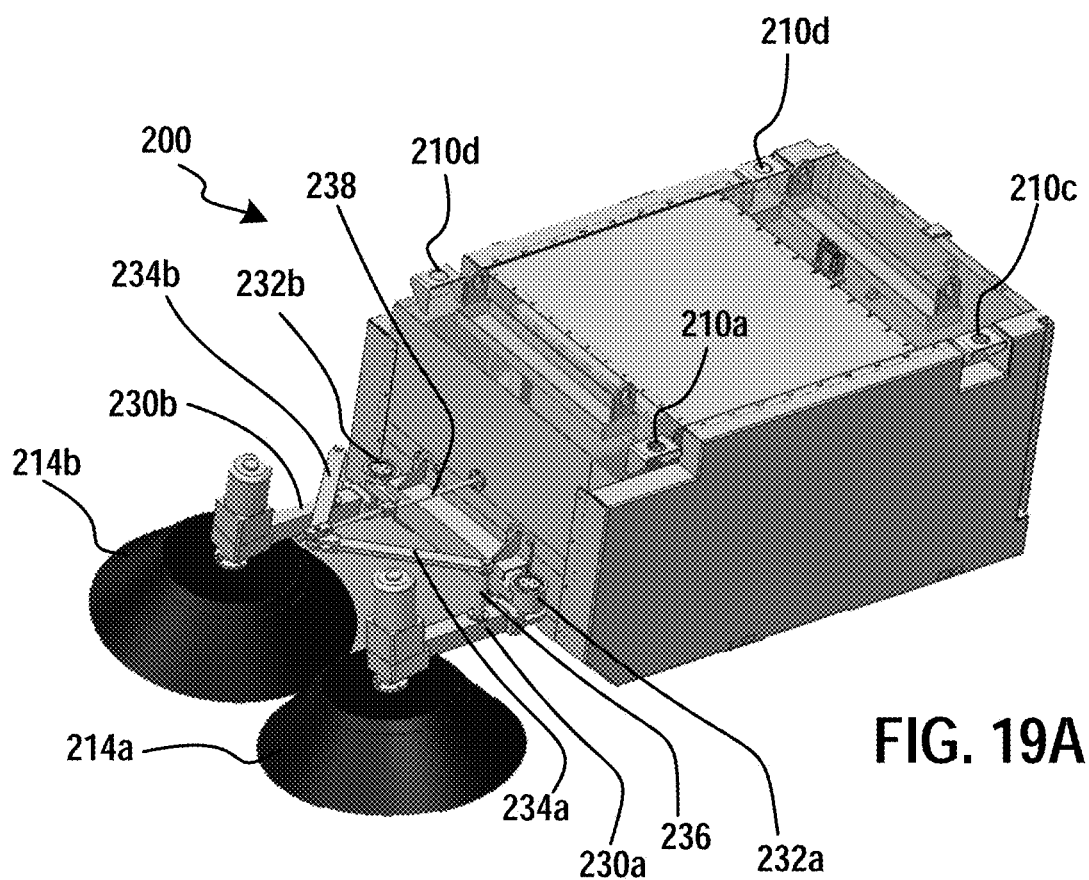
FIGS. 19A, 19B, and 19C illustrate perspective views of a sweeper module 200 in various stages of brush deployment, in accordance with implementations of the disclosure.
Figure 19B:
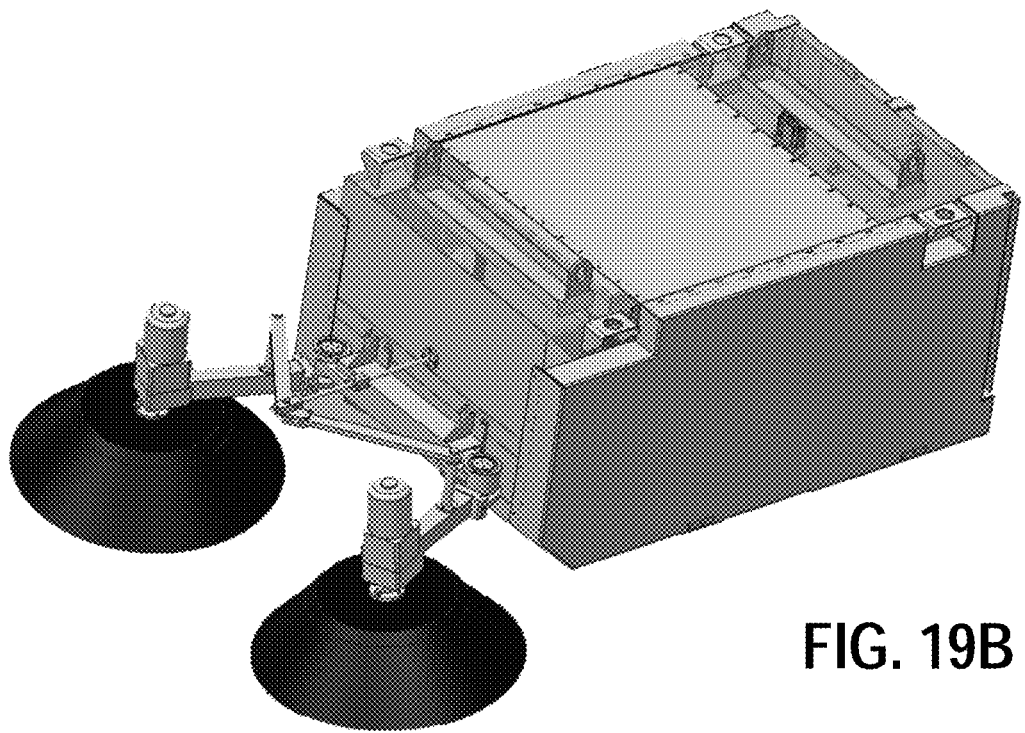
Figure 19C:
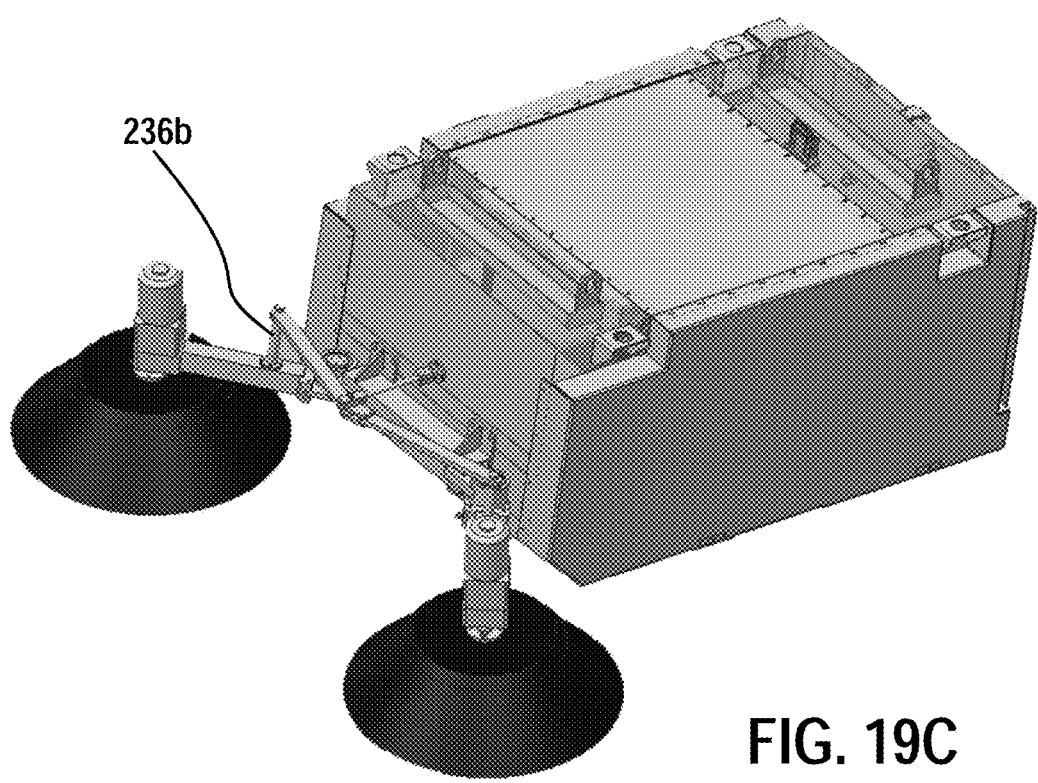
Figure 20A:
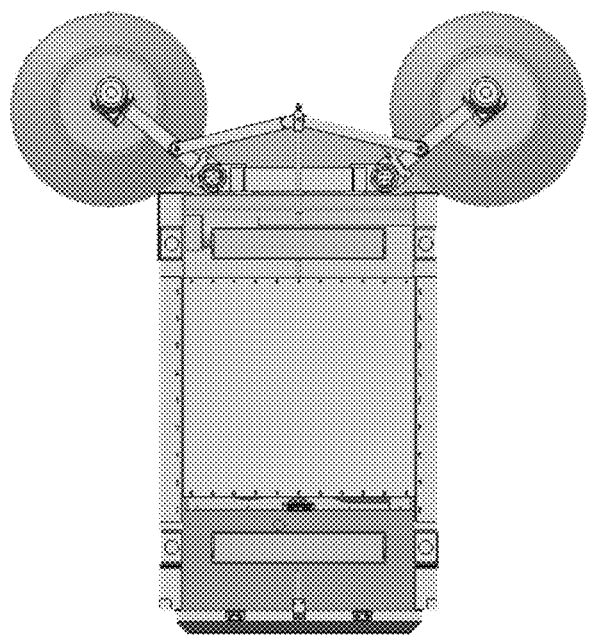
FIGS. 20A, 20B, 20C, and 20D illustrate overhead views of the sweeper module 200 in accordance with the implementation of FIG. 19A.
Figure 20B:
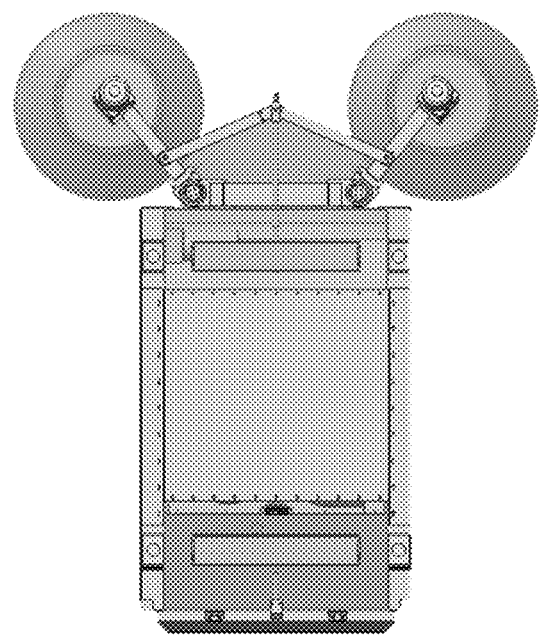
Figure 20C:
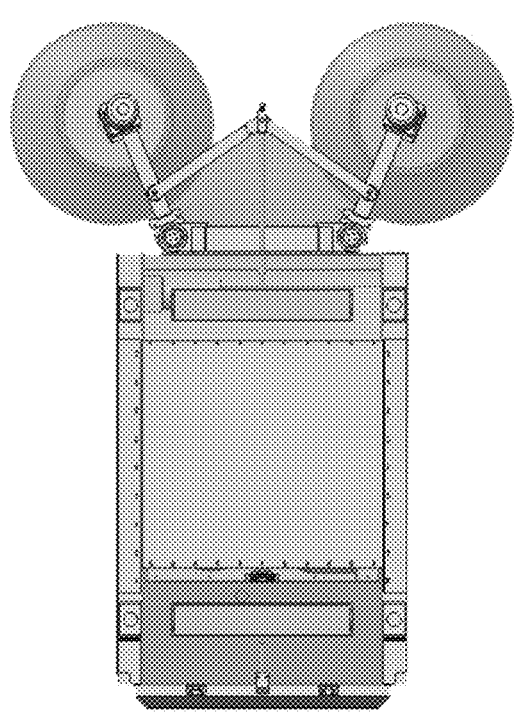
Figure 20D:
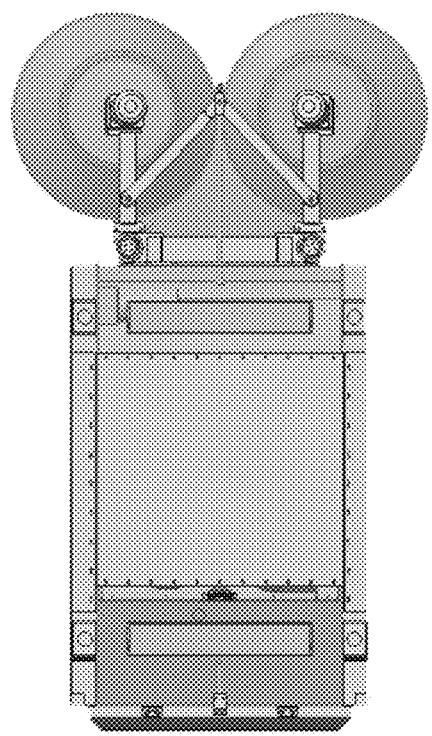
Figure 21A:
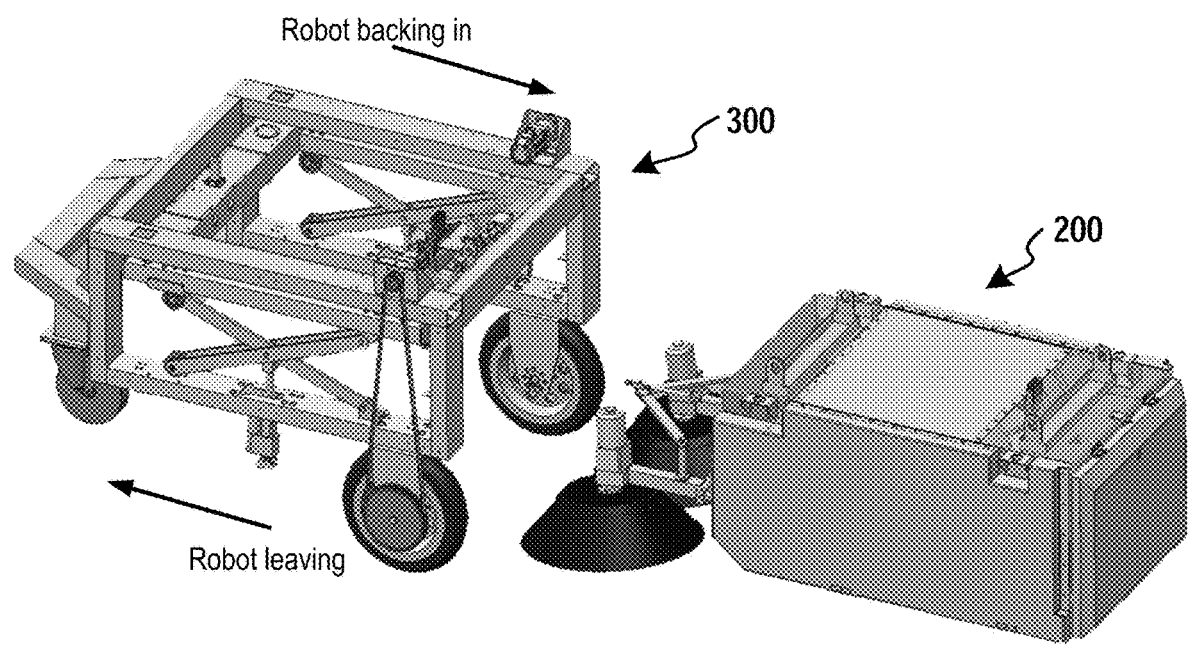
FIGS. 21A, 21B, 21C, 21D, and 21E illustrate perspective views of the robot 300 and sweeper module 200, in accordance with implementations of the disclosure.
Figure 21B:
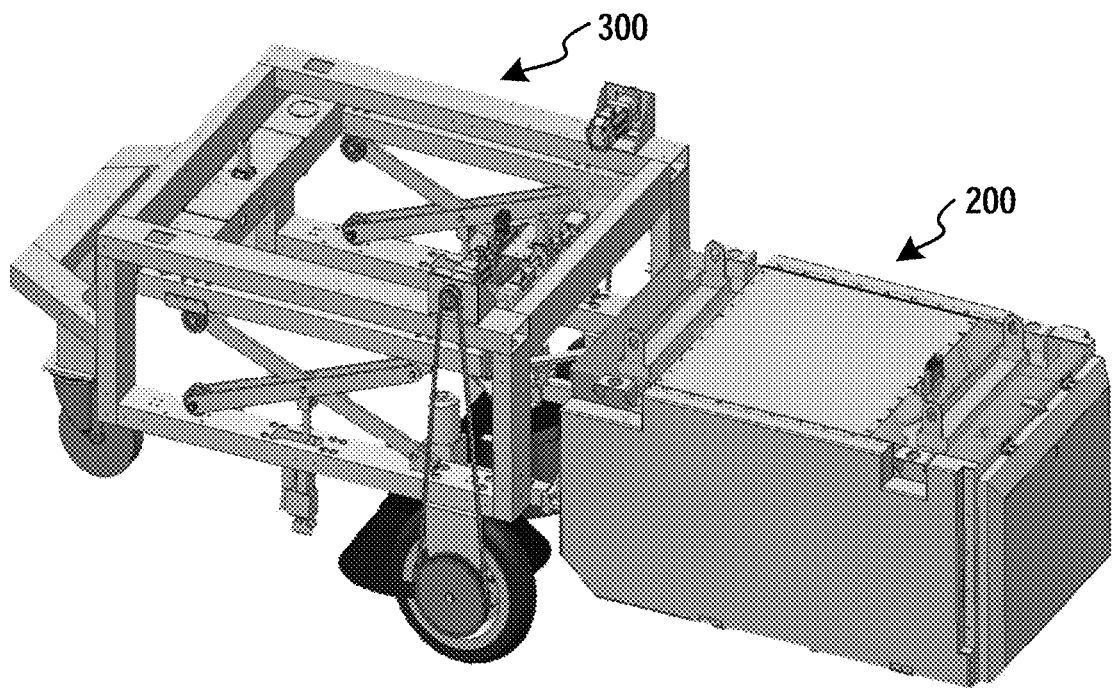
Figure 21C:
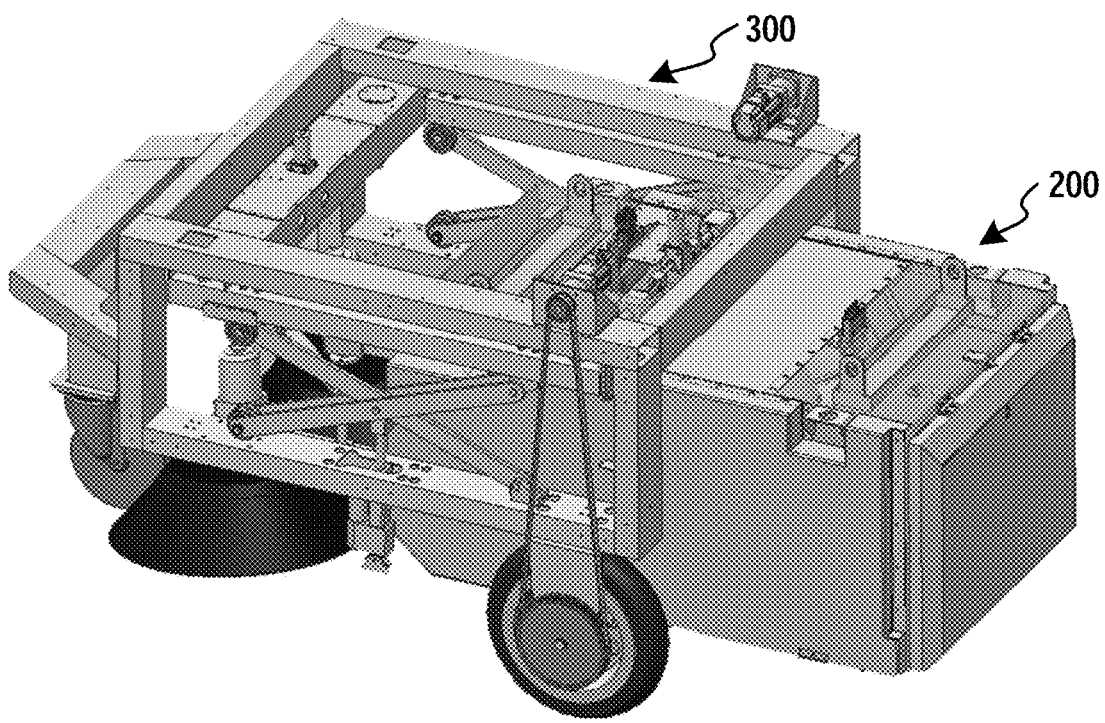
Figure 21D:
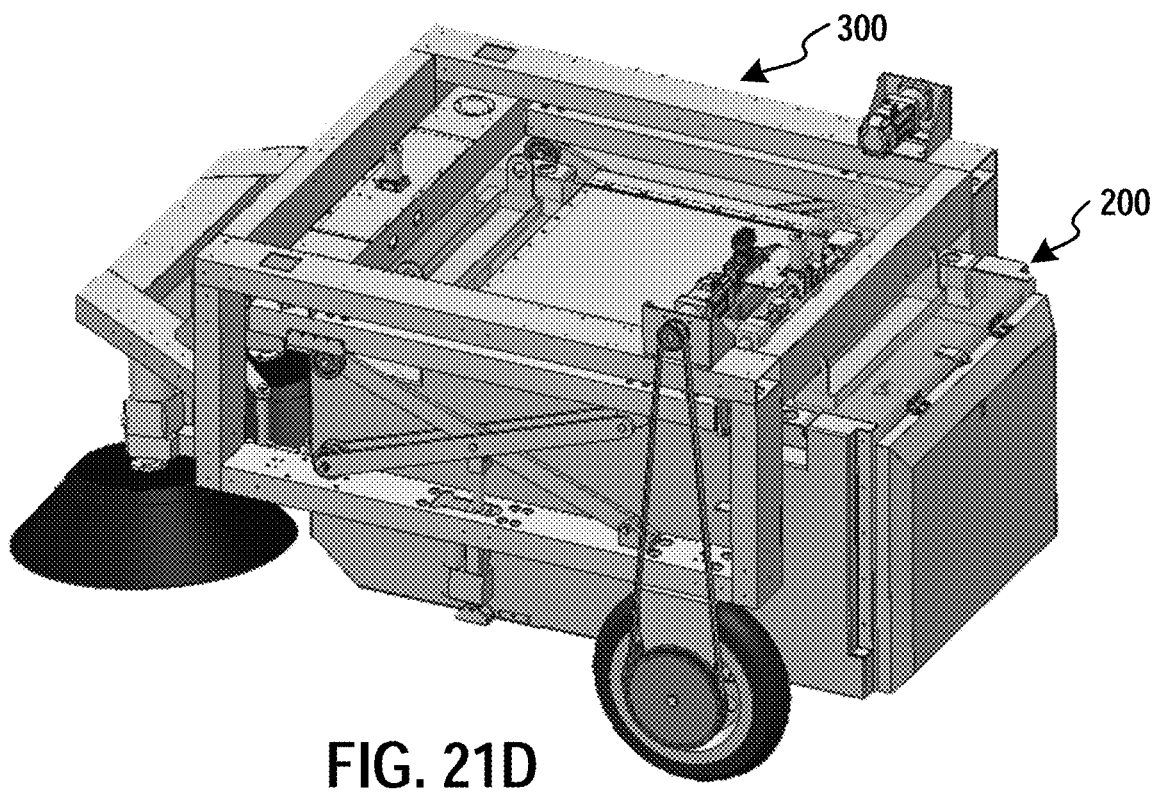
Figure 21E:
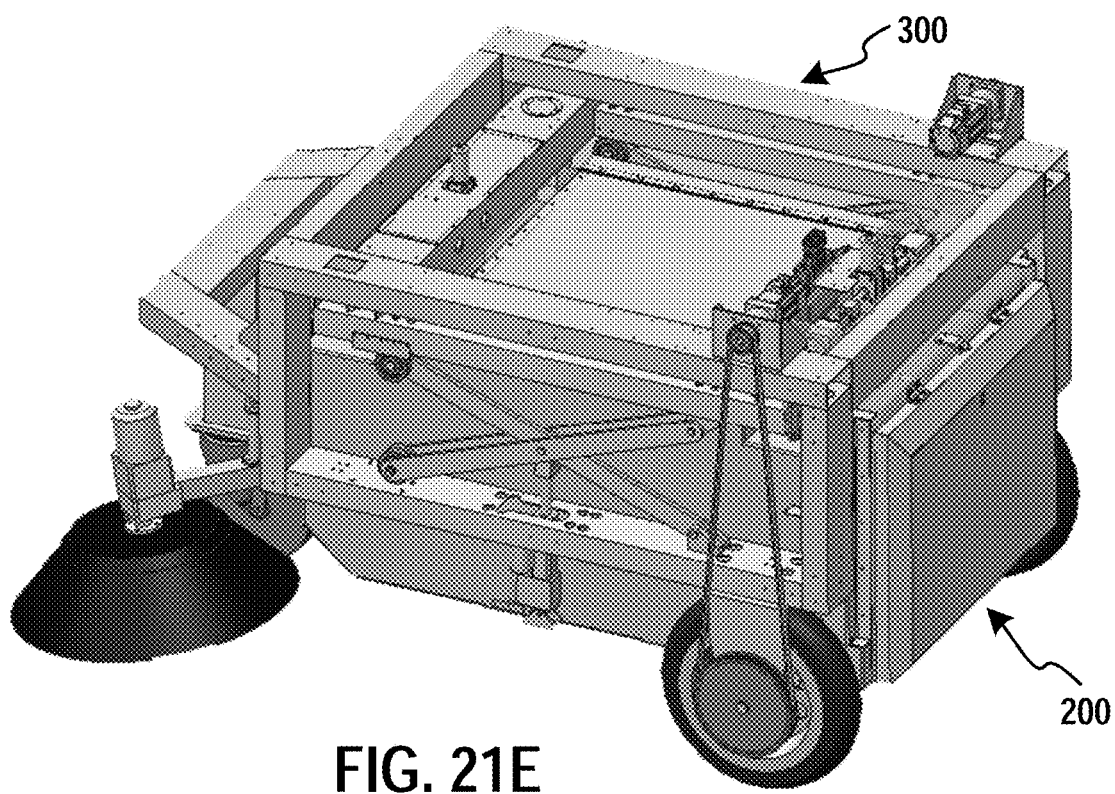
Figure 22A:
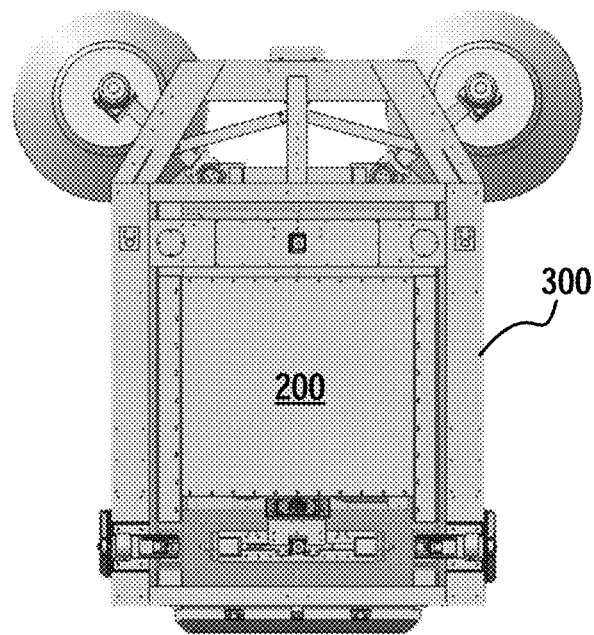
FIGS. 22A, 22B, 22C, 22D, 22E, 22F, and 22G illustrate overhead views of the robot 300 and sweeper module 200, in accordance with implementations of the disclosure.
Figure 22B:
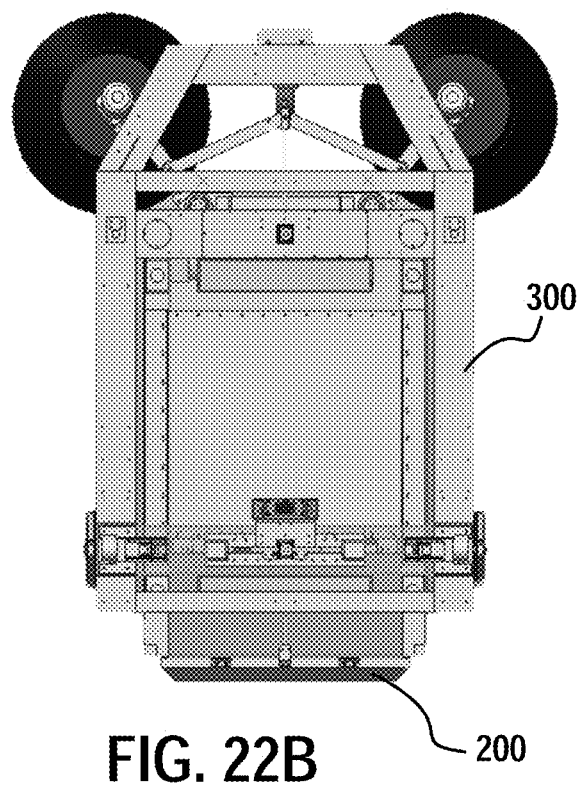
Figure 22C:
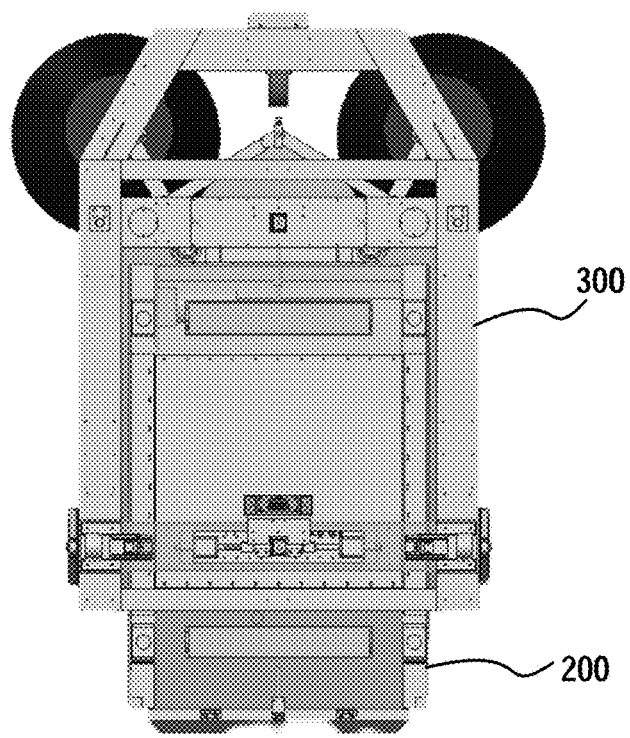
Figure 22D:
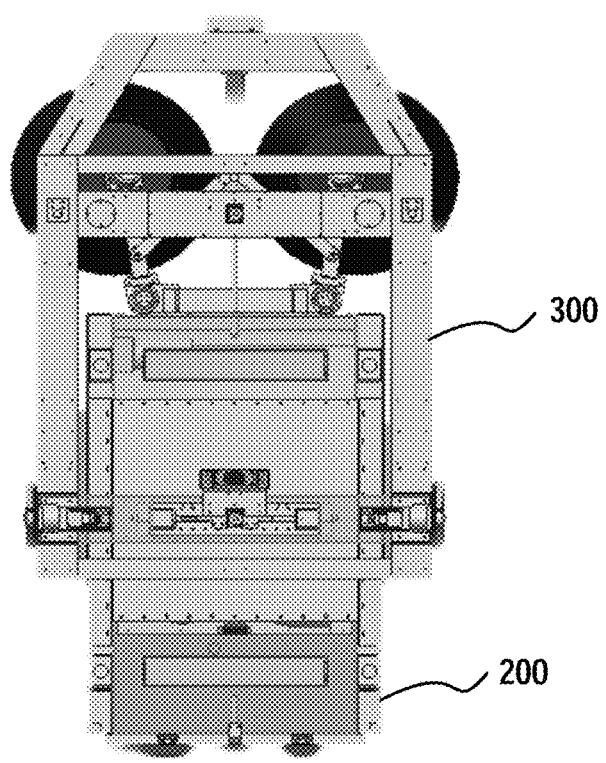
Figure 22E:
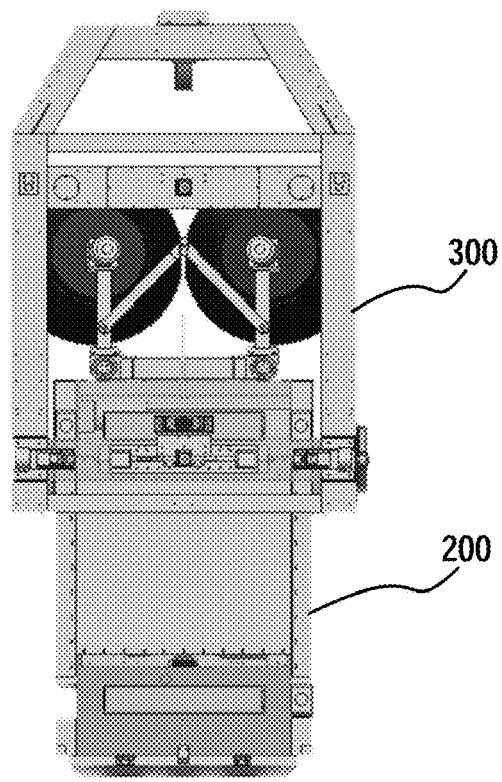
Figure 22F:
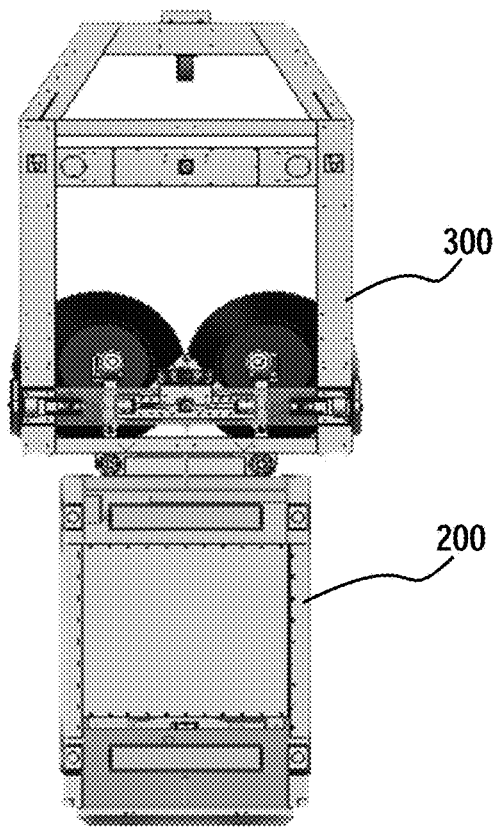
Figure 22G:
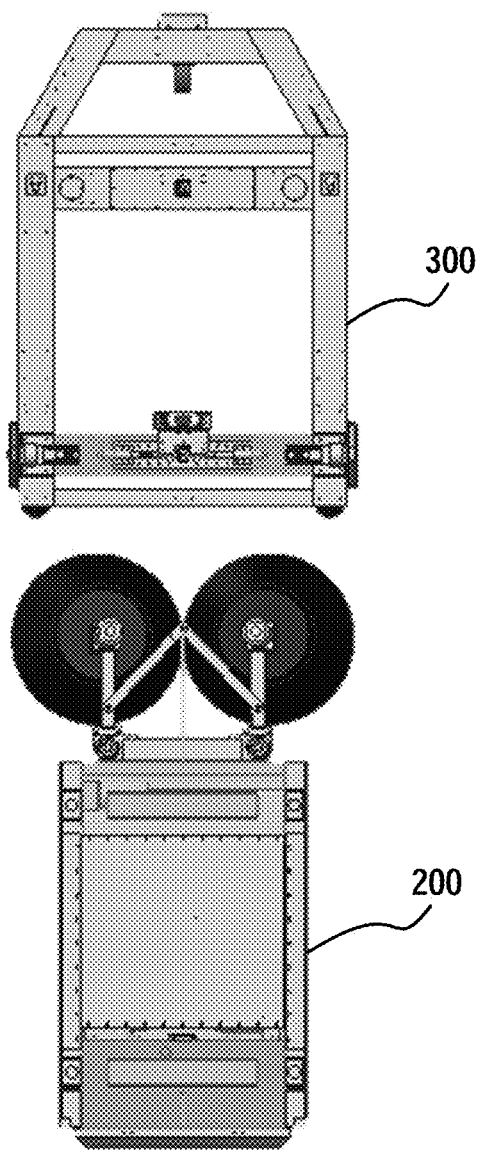

FIGS. 19A, 19B, and 19C illustrate perspective views of a sweeper module 200 in various stages of brush deployment, in accordance with implementations of the disclosure.

With reference to FIG. 19A, in the illustrated implementation, the brushes 214a/214b are connected to swing arms 230a/230b as shown, which are configured to pivot around joints 232a/232b and swing outward during deployment of the brushes. The swing arms 230a/230b are pushed outward by push arms 234a/234b, which connect to the swing arms 230a/230b via vertical connecting rods 236a/236b as shown (236b shown at FIG. 19C). The front ends of the push arms 234a/234b are connected to the front end of a center rod 238 which extends into the main body of the sweeper module 200.

When the robot 300 reverses over the sweeper module 200, the vertical beam 336 or bumper plate 337 of the robot 300 pushes the front end of the center rod 238, driving the center rod backwards into the main body of the sweeper module 200. This causes the push arms 234a/234b to push outward on the swing arms 230a/230b (via the connecting rods 236a/236b), thereby deploying the brushes 214a/214b. In some implementations, the center rod 238 and/or the joints 232a/232b are spring loaded so as to fold the swing arms 230a/230b inward (and thereby the brushes 214a/214b) in the absence of an applied force on the front end of the center rod 238, e.g. when the robot 300 disengages the sweeper module 200 and moves away from the sweeper module 200.

FIG. 19A illustrates the sweeper module 200 with the brushes 214a/214b in a non-deployed state. FIG. 19B illustrates the sweeper module 200 with the brushes 214a/214b in a partially deployed state. FIG. 19C illustrates the sweeper module 200 with the brushes 214a/214b in a fully deployed state.

FIGS. 20A, 20B, 20C, and 20D illustrate overhead views of the sweeper module 200 in accordance with the implementation of FIG. 19A.

More specifically, FIGS. 20A, 20B, 20C, and 20D show the sweeper module 200 brushes 214a/214b progressing from a fully deployed state to a non-deployed state, as would occur when the sweeper module 200 is disengaged from the robot 300 and robot 300 moves away from the sweeper module 200.

FIGS. 21A, 21B, 21C, 21D, and 21E illustrate perspective views of the robot 300 and sweeper module 200, in accordance with implementations of the disclosure.

In the progression shown in the FIGS. 21A, 21B, 21C, 21D, and 21E, the robot 300 reverses over the sweeper module 200, so that the sweeper module 200 fits within the volume in the interior of the robot 300. As the robot 300 reverses over the sweeper module 200, the brushes are deployed as described above.

FIGS. 22A, 22B, 22C, 22D, 22E, 22F, and 22G illustrate overhead views of the robot 300 and sweeper module 200, in accordance with implementations of the disclosure.

More specifically, in the progression shown by FIGS. 22A, 22B, 22C, 22D, 22E, 22F, and 22G, the robot 300 is shown moving away from the sweeper module 200, causing the brushes to automatically fold inward.

Figure 23A:
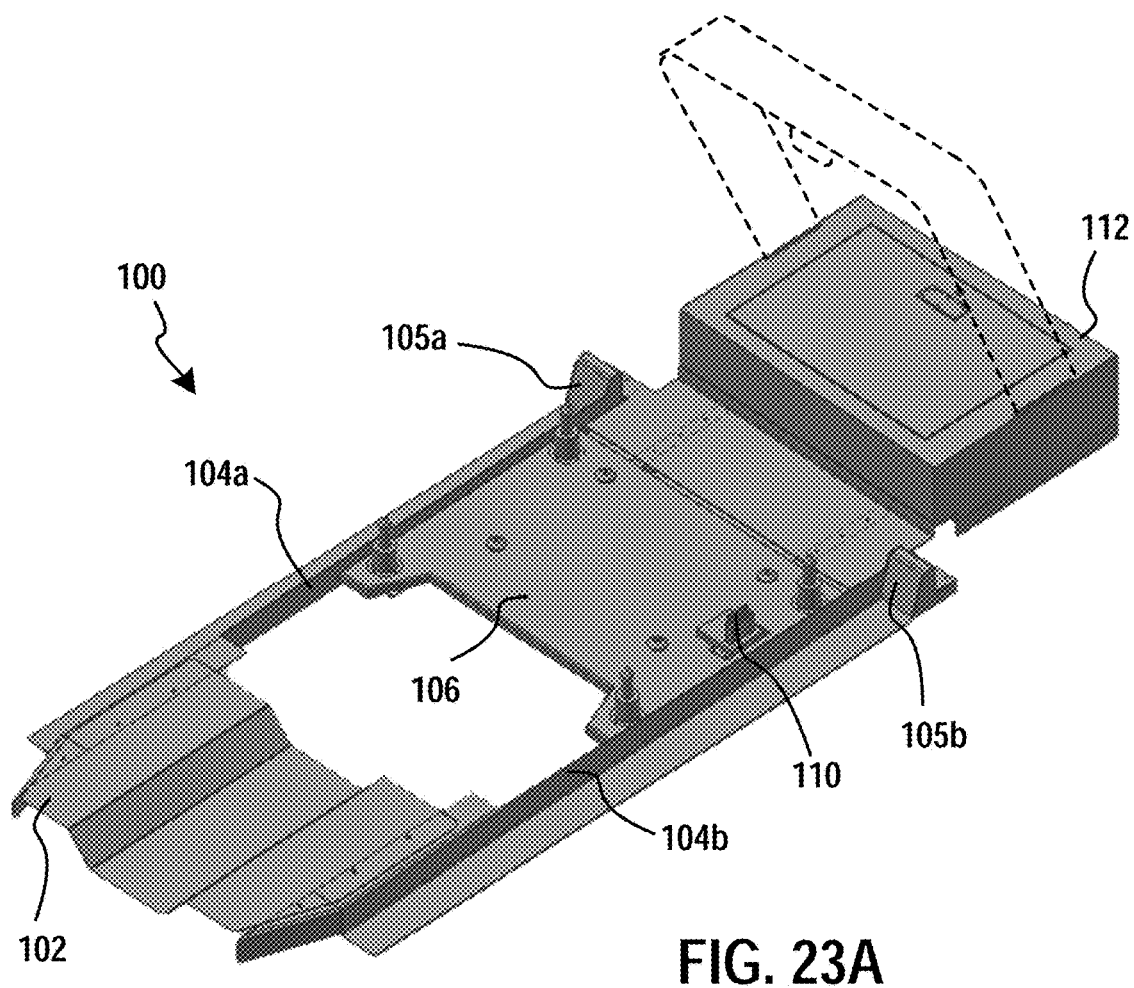
FIG. 23A illustrates a perspective view of a dock assembly 100, in accordance with implementations of the disclosure.

FIG. 23A illustrates a perspective view of a dock assembly 100, in accordance with implementations of the disclosure.

In the illustrated implementation, the dock assembly 100 is configured for the robot 300 to reverse into docking, so that the rear wheels of the robot 300 approach the dock assembly 100 first, guided by the rails 104a/104b. In the illustrated implementation, the base plate 102 is positioned at the entry onto the dock assembly 100, with a center portion of the base plate 102 being depressed to accommodate the front wheel 338 of the robot 300.

Figure 23B:
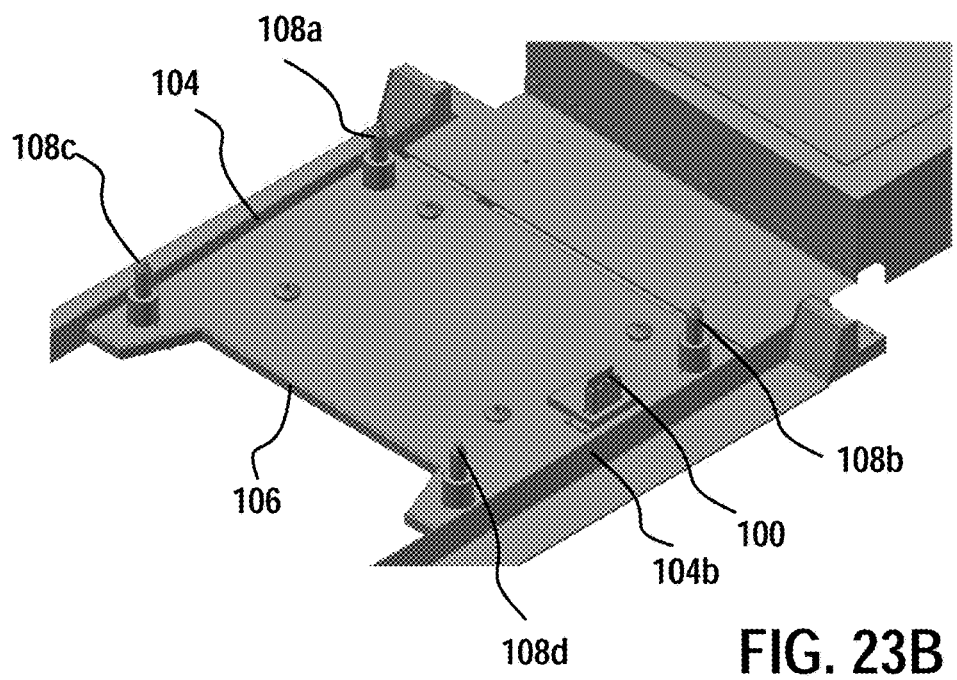
FIG. 23B illustrates a close-up view of the alignment platform 106 of the dock assembly 100, in accordance with the implementation of FIG. 23A.

FIG. 23B illustrates a close-up view of the alignment platform 106 of the dock assembly 100, in accordance with the implementation of FIG. 23A.

Figure 23C:
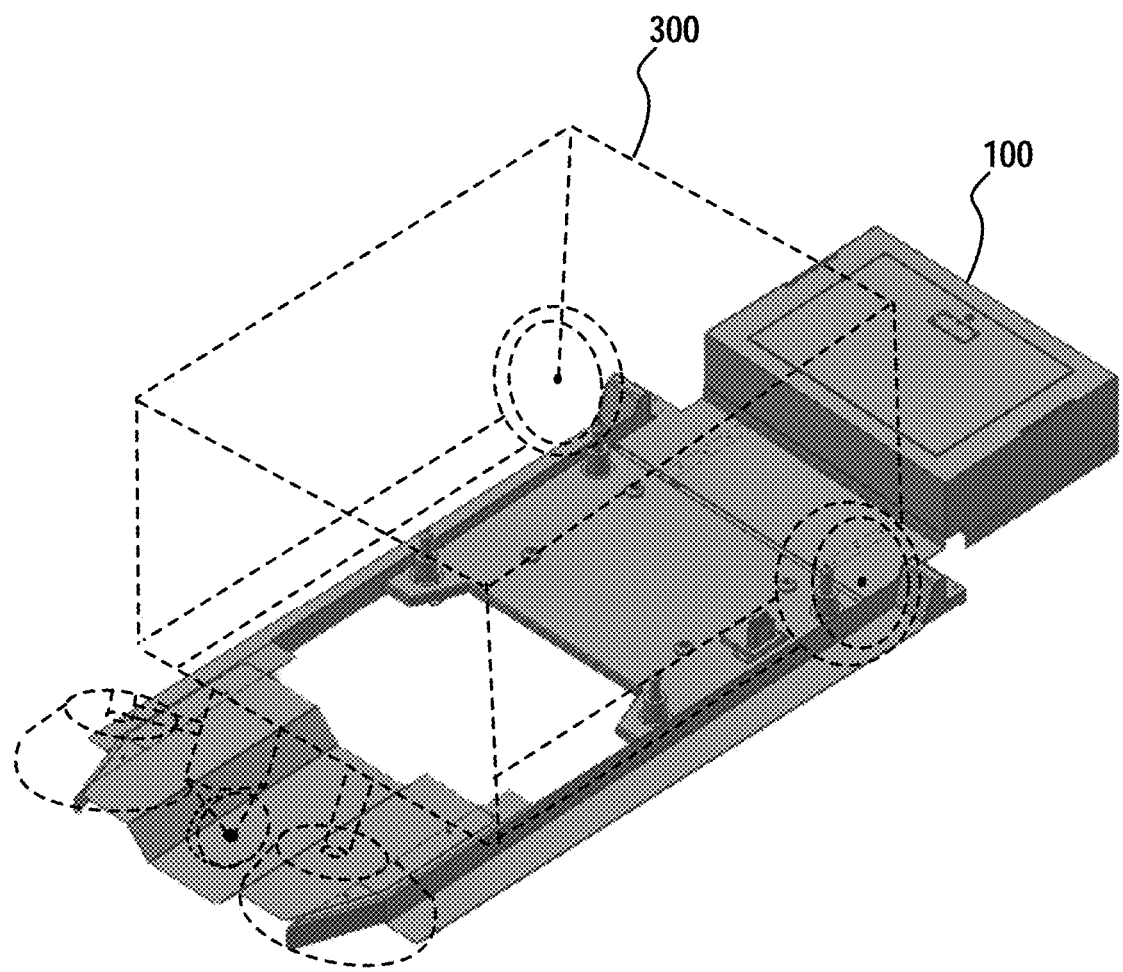
FIG. 23C illustrates a robot 300 docked at the dock assembly 100, in accordance with the implementation of FIG. 23A.

FIG. 23C illustrates a robot 300 docked at the dock assembly 100, in accordance with the implementation of FIG. 23A.

Figure 23D:
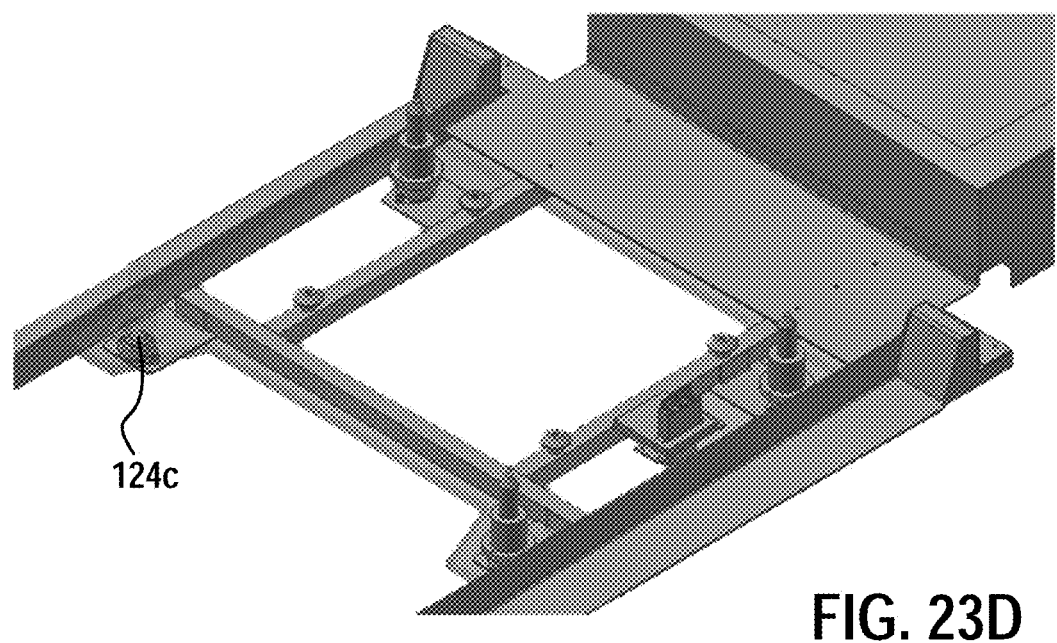
FIG. 23D illustrates a close-up view of the alignment platform 106 of the dock assembly 100, in accordance with the implementation of FIG. 23A.

FIG. 23D illustrates a close-up view of the alignment platform 106 of the dock assembly 100, in accordance with the implementation of FIG. 23A.

In the illustrated view, the plate portion of the alignment plate 106 has been rendered invisible so as to reveal the underlying bearing frame 120.

Further in the illustrated view, one of the ball bearings 124c is clearly visible.

Figure 23E:
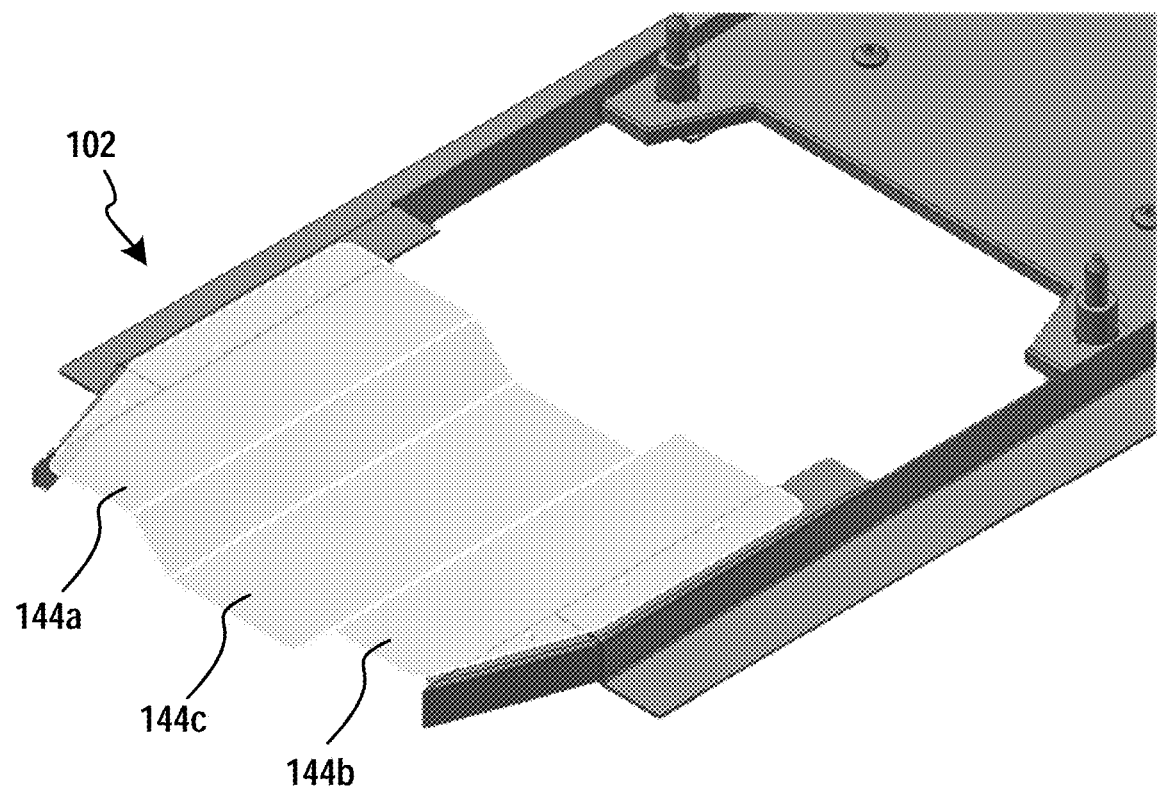
FIG. 23E illustrates a close-up view of the base plate 102 of the dock assembly 100, in accordance with the implementation of FIG. 23A.

FIG. 23E illustrates a close-up view of the base plate 102 of the dock assembly 100, in accordance with the implementation of FIG. 23A.

In the illustrated implementation, the base plate 102 includes elevated side portions 144a and 144b, and a center channel 144c that is a lowered portion of the base plate 102.

Figure 24:
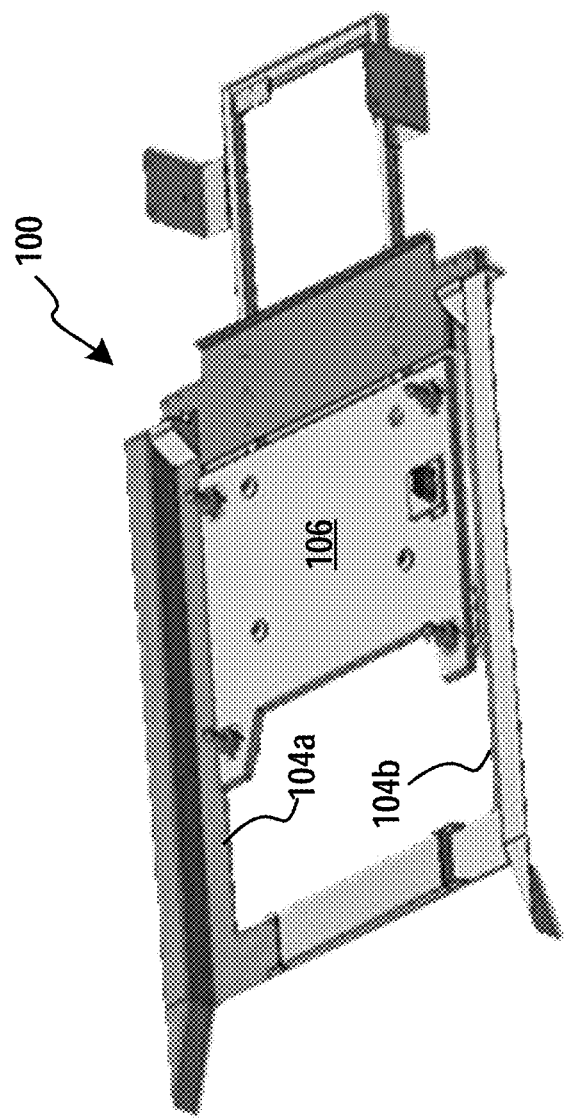
FIG. 24 illustrates a perspective view of a dock assembly 100, in accordance with implementations of the disclosure.

FIG. 24 illustrates a perspective view of a dock assembly 100, in accordance with implementations of the disclosure.

In the illustrated implementation, the guide rails 104a and 104b of the dock assembly 100 are configured to be external to the wheels of the robot 300, so that the wheels fit inside of the guide rails when docking at the dock assembly 100.

Figure 25A:
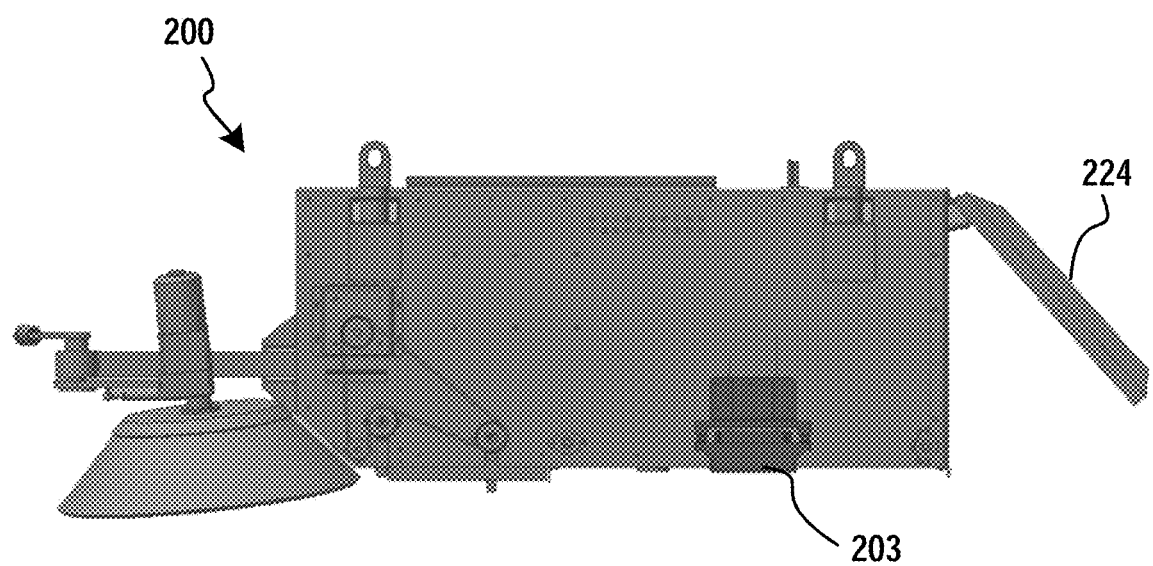
FIG. 25A illustrates a side view of the sweeper module 200, in accordance with implementations of the disclosure.

FIG. 25A illustrates a side view of the sweeper module 200, in accordance with implementations of the disclosure.

In the illustrated view, the side cover of the sweeper module 200 is removed to reveal the structures more clearly, including the connector 203.

Figure 25B:
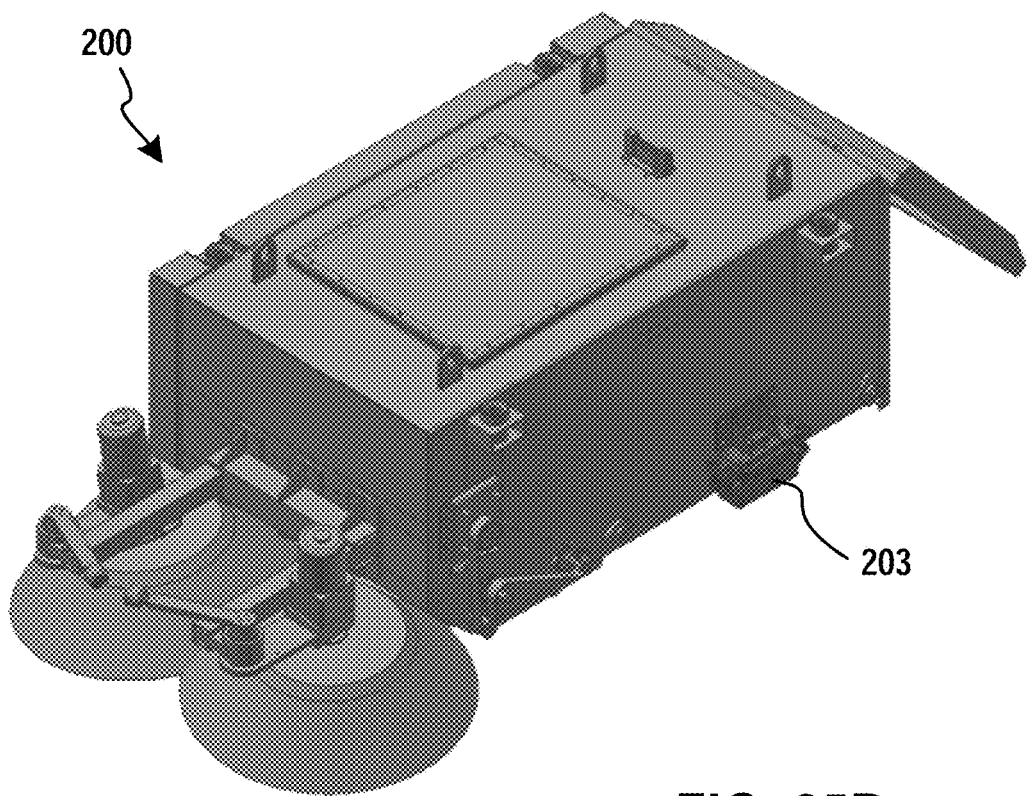
FIG. 25B illustrates a perspective view of the sweeper module 200, in accordance with the implementation of FIG. 25A.

FIG. 25B illustrates a perspective view of the sweeper module 200, in accordance with the implementation of FIG. 25A.

Figure 26:
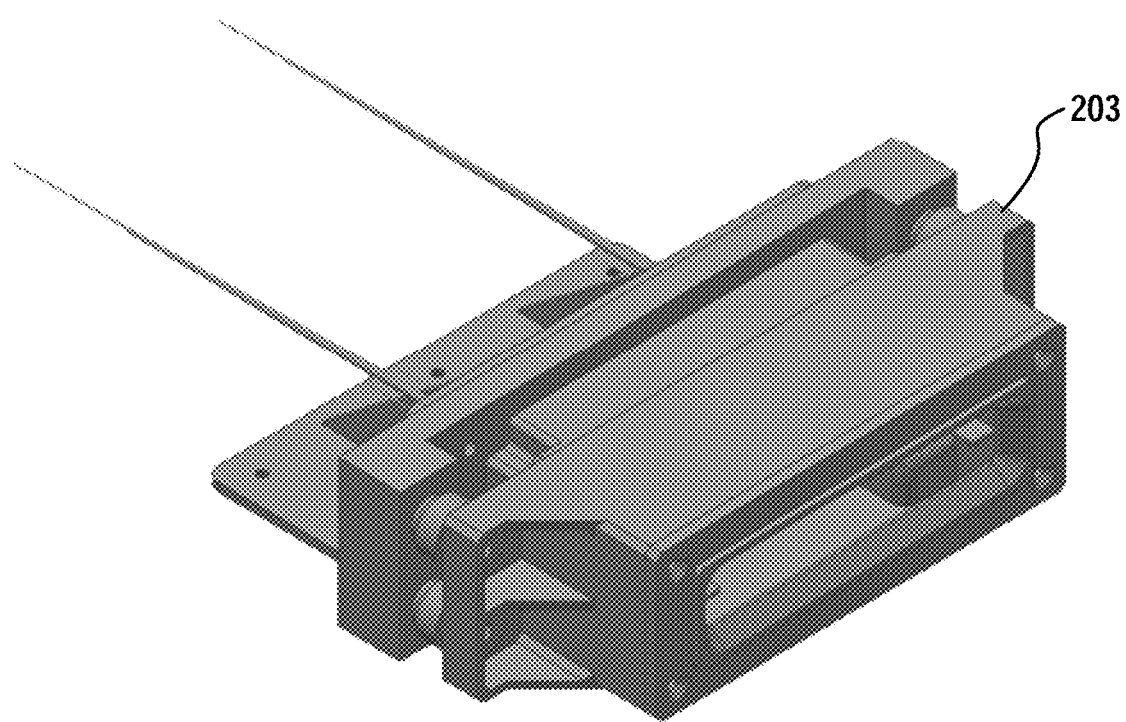
FIG. 26 illustrates a close-up perspective view of the connector 203, in accordance with implementations of the disclosure.

FIG. 26 illustrates a close-up perspective view of the connector 203, in accordance with implementations of the disclosure.

Though in implementations of the disclosure described above, a sweeper module 200 has been discussed, it will be appreciated that in other implementations, other types of modules having different functions can be attached to the robot 300. That is, the lift mechanism of the robot 300 can define an attachment retention system that allows the robot to retain two or more interchangeable modules/attachments for performing tasks. The interchangeable attachments may each be configured to perform a unique task, e.g., steam cleaning, vacuuming, grass cutting, polishing, polishing, driveway and/or street cleaning (e.g., sweeping), package grasping and/or moving, etc. In some embodiments, the interchangeable attachments may be configured to perform complementary tasks. For example, for cleaning a floor, the first interchangeable attachment may be configured to vacuum the floor and the second interchangeable attachment may be configured to steam clean the floor.

In some implementations, the interchangeable attachments may be automatically loaded and unloaded from the robot one or more dock assemblies (or docking stations or base stations). The loading and unloading may be performed autonomously, with the robot automatically aligning itself and loading or unloading an interchangeable attachment as needed to accomplish the job assignment that the robot has been programmed to perform.

In some embodiments, the vertical movement of attachments achieved via the lift mechanism of the robot 300 may be utilized as part of performing a task and/or to accommodate interchangeable attachments of different sizes. For example, in the case of a sweeper module 200 the lift mechanism can be utilized to lift the sweeper module 200 to a height required to remove the sweeper module from the dock assembly. The lift mechanism can also be used to lower the sweeper module 200 to the appropriate height for carrying out sweeper operations, such as a height at which the brushes of the sweeper module fully contact the floor.

In some implementations, the robot includes a controller that is configured to control the autonomous functions of the robot. For example, the controller can control the motors which effect movement of the wheels of the robot to move the robot in its operations, such as to control movement of the robot over the sweeper module, and move autonomously along a path to capture debris into the container of the sweeper module. Further, the controller can control the robot's lift mechanism to lower the lift frame over the sweeper module to connect the alignment pegs with the alignment holes, control the locking mechanism to secure the lift frame to the sweeper module, and control the lift mechanism to raise the lift frame along with the sweeper module toward the interior space of the robot. It will be appreciated that the controller may control these operations in reverse so as to lower the lift frame along with the sweeper module, to seat the sweeper module onto the alignment platform, unlock the sweeper module so as to release the sweeper module, control the lift mechanism to raise the lift frame without the sweeper module, and move the robot off of the dock assembly while leaving the sweeper module at the dock assembly, for example, to allow the sweeper module to charge its battery or be serviced otherwise.

It will be appreciated that in some implementations, the robot includes a battery for powering its motors, lift mechanism, sensory systems, and other electronic systems. The sweeper module can also include a battery for powering the sweeper module, such as powering rotation of its brushes. In some implementations, a battery controller handles sharing of power between the robot's battery and the sweeper module's battery. The battery controller can be implemented as part of the robot or the sweeper module, or partially implemented on both the robot and the sweeper. In some implementations, power from the sweeper module's battery can be shared to the robot to, for example, charge the robot's battery, power the robot's motors, lift mechanism, locking mechanism, sensors, communications, etc. Likewise, in some implementations, power from the robot's battery can be shared to the sweeper module to, for example, charge the sweeper module's battery, power the sweeper module's brushes, etc.

In some implementations, the battery of the sweeper module is significantly larger than the battery of the robot, as the sweeper module is retained at the docking station and subject to charging for greater periods of time. Hence, the battery of the sweeper module can be implemented as the primary power source for the sweeper module as well as the robot, and therefore used to power the functions of both units.

In some implementations, when the sweeper module is connected to the docking station, and the robot is connected to the sweeper module, then the battery controller can route power to effects charging of one or both of the sweeper module's battery and the robot's battery. It will be appreciated that the battery controller routes power received from the docking station through the sweeper module to the robot, in order to provide power to the robot to charge its battery.

In some implementations, the robot includes a plurality of cameras and a global positioning system (GPS) for controlling movement of the robot by the controller. In some implementations, the robot uses one or more cameras to align with a visible code located at the dock system as described above, and images of the visible code are processed by the controller for guiding the robot to align with the dock system when the robot approaches the dock system for pickup or release of the sweeper module.

Advantageously, robots according to various embodiments disclosed herein may run indefinitely, with the robot constantly swapping batteries and interchangeable attachments as the need arises and as job assignments change. As a result, the robot may function as a home cleaning robot, a commercial cleaning robot, an outdoor robot, an indoor robot, etc. which may autonomously change its abilities without the need of human interaction (e.g., from grass cutting with a grass cutting attachment, to moving bins and crates of an adapter for supporting bins and crates, to cleaning driveways with a vacuum and/or sweeping attachment). An example of the operation of the robot is provided below. It will be appreciated that the sequence below may be performed in the order shown. In addition, omissions of certain actions and/or changes in the order of various actions are also contemplated.

1. The robot may start off at a charging base station with an interchangeable attachment (e.g., a sweeper module) locked to the main chassis or body of the robot through its retention system.

2. The robot may start off with a power supply (e.g., a removable battery) already in place.

3. The robot heads out of the charging base to perform its assignment (in this case sweeping).

4. When the robot is finished with the assignment (finished sweeping a given area), or when the interchangeable attachment is filled to capacity (e.g., when a sweeper module is filled with debris) the robot will return to the base station or another designated drop area, and detach the interchangeable attachment. The detachment may occur via unlock and pushout of the attachment, or by dropping the attachment under the force of gravity.

5. The robot aligns itself to the interchangeable attachment, or wherever the retention adapters are among the interchangeable attachments, moves towards the interchangeable attachment, centers itself (e.g., using sensors such as a camera) and the retention system locks/unlocks the interchangeable attachment as desired. When the robot approaches the base/charging station, at a certain distance it starts a docking procedure. The robot maintains a docking distance from the base station to help itself align to the back of the modular box as well as to the retention system before the robot docks.

6. This docking procedure exists in both retaining and detaching the interchangeable attachments at a designated area or a base/charging station.

7. The base station may help guide the robot via sensors and buttons to dock at the base station and aligned with the retention system. In other words, the base station may provide guidance for the robot to return to the station. In addition, the station may include an actuator that shifts the position of the interchangeable attachment to align with the retention system of the robot.

8. The robot may move towards and locate the base station with a variety of sensors, such as live feed cameras, infrared or other proximity sensors, ground sensors, or line detection sensors that are able to follow "tracks" which may be provided on the ground along the path which the robot is to traverse. The tracks may be, e.g., anything from tape that is sensed by the robot, paint sensors disposed or integrated into a surface, or sensors embedded at specific locations in the ground. The use of tracks in one embodiment is optional, since the robot will be able to use its cameras and sensors to navigate and avoid obstacles.

9. The robot may use a variety of sensors such as live feed cameras and/or infrared or other proximity sensors to help locate, and load and unload the interchangeable attachments at a base station or other designated area.

10. The robot may move to an empty location (e.g., at the base station or at a designated area) and detach its interchangeable attachment. Preferably, this detachment occurs at the location the interchangeable attachment was originally picked up from, e.g., at the space left open when the component was earlier retained by the robot.

11. The robot may then move to another interchangeable attachment for another task. For example, the robot may align itself with a steam cleaning interchangeable attachment located at the base station (e.g., next to or around the vacuum interchangeable attachment), and pick up the steam cleaning interchangeable attachment via the retention system, and then move away from base station to perform the steam cleaning task. In some other embodiments, both the vacuum attachment and the steam cleaning attachment may be loaded onto the robot such that vacuuming and steam cleaning maybe performed without requiring the robot to return to the base station to switch attachments.

12. The robot can navigate with the help of GPS, in addition to other location devices not positioned on the robot itself or the base station to help with returning to an interchangeable attachment for docking and undocking. These are location devices may include Bluetooth beacons or infrared light emitters.

13. In cases where the robot is equipped with a modular, removable power supply, the power supply may be unloaded and a new power supply may be loaded in a procedure similar to the unloading and loading of interchangeable attachments. For example, where the robot has performed various tasks and its attached battery is running low, the robot may: move to a base station containing a charged or charging battery, unload a depleted battery at the base station or designated area, and load another battery.

14. In cases where the robot is not equipped with a modular, removable power supply, the robot may use a variety of sensors to return to the base station for recharging. The robot may return to the base station to recharge, head off to finish its job, or remain at the base station depending on whether a job assignment has been completed.

15. The robot may be charged while retaining an interchangeable attachment. For example, such charging may be performed via connectors built into the robot that send signals and power to both the interchangeable attachments and the robot's main computer system. In some embodiments, charging may occur without the robot retaining any interchangeable attachment.

16. It will be appreciated that the interchangeable attachment may be tracked by the robot using shape/color or design. Such tracking may be utilized to align to the robot for unloading and loading the interchangeable attachment.

It will be appreciated by those skilled in the art that various omissions, additions and modifications can be made to the processes and structures described above without departing from the scope of the invention. For example, it will be appreciated that the robot has been shown without any side panels or other housing around the functional illustrated components. In some embodiments, a housing or shell may be provided around the illustrated components e.g., to protect these functional components from collisions of external objects, weather, or other external phenomena that may damage these functional components. In addition, the housing may maintain a consistent external appearance and size/shape to the robot, irrespective of the sizes of the interchangeable attachments or the number of retained attachments. This may provide aesthetic benefits and/or allow a consistent interface with other devices external to the robot (e.g., a base station) irrespective of modifications to the internal components or interchangeable attachments. In addition, while various components have been illustrated and discussed as being placed at different locations, it will be appreciated that the relative locations of the various compliments may be varied while still maintaining the functionality disclosed herein. It is contemplated also that various combinations or sub-combinations of the specific features and aspects of the embodiments may be made and still fall within the scope of the description. Various features and aspects of the disclosed embodiments can be combined with, or substituted for, one another in order. All such modifications and changes are intended to fall within the scope of the invention, as defined by the appended claims.

What is claimed is:

1. A system, comprising:
   a sweeper module;
   a robot, said robot having a chassis defining an interior space of the robot, the interior space configured to accommodate the sweeper module, said robot configured to engage and disengage the sweeper module, wherein engaging the sweeper module secures the sweeper module to the robot in the interior space, wherein when the sweeper module is secured to the robot, then the robot is capable of moving the sweeper module over a surface;
   a dock assembly configured for docking of the robot, said dock assembly having an alignment platform that is configured to receive the sweeper module from the robot when the robot is docked and disengages the sweeper module,
   said alignment platform having a plurality of cones positioned on a top side of the alignment platform, the plurality of cones being configured to engage a plurality of holes positioned on an underside of the sweeper module when the sweeper module becomes disengaged from the robot, wherein the plurality of cones enable self-alignment of the alignment platform to the sweeper module as the plurality of cones engage the plurality of holes,
   said alignment platform further having a plurality of support pads positioned on a bottom side of the alignment platform, the support pads configured to rest on a plurality of bearings that permit lateral movement of the alignment platform when the plurality of cones engage the plurality of holes and the alignment platform self-aligns to the sweeper module.

2. The system of claim 1, wherein the plurality of cones are substantially conically shaped, such that during engagement of a given cone with a corresponding hole, when the given cone is off-center with respect to the corresponding hole, then the given cone self-centers with respect to the corresponding hole.

3. The system of claim 2, wherein the self-centering of the given cone with respect to the corresponding hole causes the lateral movement of the alignment platform as permitted by the plurality of support pads that rest on the plurality of bearings.

4. The system of claim 1, wherein the plurality of support pads have concave bottom surfaces that contact the bearings, the concave bottom surfaces configured to self-center the support pads over the bearings while permitting the lateral movement of the alignment platform.

5. The system of claim 1, wherein the bearings are ball bearings that enable substantially omnidirectional lateral movement of the support pads over the bearings.

6. The system of claim 1, wherein the robot includes a lift frame and a lift mechanism, wherein engaging the sweeper module by the robot includes using the lift mechanism to lower the lift frame onto a top side of the sweeper module, securing the sweeper module to the lift frame, and using the lift mechanism to raise the lift frame so as to raise the sweeper module.

7. The system of claim 6, wherein the lift frame includes one or more locking pins, and wherein the sweeper module includes one or more brackets positioned on a top side of the sweeper module;

wherein securing the sweeper module to the lift frame includes driving the one or more locking pins through the one or more brackets, respectively.

8. The system of claim 1, wherein raising the sweeper module causes the cones to disengage from the holes.

9. A dock assembly, comprising:
the dock assembly is configured for docking with a robot;
an alignment platform of said dock assembly is configured to receive a sweeper module from the robot when the robot is docked and said sweeper module disengages from the robot,
said alignment platform having a plurality of cones positioned on a top side of the alignment platform, the plurality of cones being configured to engage a plurality of holes positioned on an underside of the sweeper module when the sweeper module becomes disengaged from the robot, wherein the plurality of cones enable self-alignment of the alignment platform to the sweeper module as the plurality of cones engage the plurality of holes,
said alignment platform further having a plurality of support pads positioned on a bottom side of the alignment platform, the support pads configured to rest on a plurality of bearings that permit lateral movement of the alignment platform when the plurality of cones engage the plurality of holes and the alignment platform self-aligns to the sweeper module.

10. The dock assembly of claim 9, wherein the plurality of cones are substantially conically shaped, such that during engagement of a given cone with a corresponding hole, when the given cone is off-center with respect to the corresponding hole, then the given cone self-centers with respect to the corresponding hole.

11. The dock assembly of claim 10, wherein the self-centering of the given cone with respect to the corresponding hole causes the lateral movement of the alignment platform as permitted by the plurality of support pads that rest on the plurality of bearings.

12. The dock assembly of claim 9, wherein the plurality of support pads have concave bottom surfaces that contact the bearings, the concave bottom surfaces configured to self-center the support pads over the bearings while permitting the lateral movement of the alignment platform.

13. The dock assembly of claim 9, wherein the bearings are ball bearings that enable substantially omnidirectional lateral movement of the support pads over the bearings.

14. The dock assembly of claim 9, wherein the robot has a chassis defining an interior space of the robot, the interior space configured to accommodate the sweeper module, said robot configured to engage and disengage the sweeper module, wherein engaging the sweeper module secures the sweeper module to the robot in the interior space, wherein when the sweeper module is secured to the robot, then the robot is capable of moving the sweeper module over a surface.

15. The dock assembly of claim 14, wherein the robot includes a lift frame and a lift mechanism, wherein engaging the sweeper module by the robot includes using the lift mechanism to lower the lift frame onto a top side of the sweeper module, securing the sweeper module to the lift frame, and using the lift mechanism to raise the lift frame so as to raise the sweeper module.

\* \* \* \* \*